(12) United States Patent
De Luxán Hernández et al.

(10) Patent No.: US 12,120,351 B2
(45) Date of Patent: Oct. 15, 2024

(54) IMAGE DATA COMPRESSION USING SWITCHING BETWEEN A SET OF TRANSFORMS

(71) Applicant: Fraunhofer-Gesellschaft zur Foerderung der angewandten Forschung e.V., Munich (DE)

(72) Inventors: Santiago De Luxán Hernández, Berlin (DE); Detlev Marpe, Berlin (DE); Klaus-Robert Mueller, Berlin (DE); Heiko Schwarz, Panketal (DE); Thomas Wiegand, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/246,134

(22) Filed: Jan. 11, 2019

(65) Prior Publication Data

US 2019/0149845 A1     May 16, 2019

Related U.S. Application Data

(63) Continuation of application No. PCT/EP2017/067708, filed on Jul. 13, 2017.

(30) Foreign Application Priority Data

Jul. 14, 2016   (EP) ..................... 16179405

(51) Int. Cl.
*H04N 19/61*   (2014.01)
*H04N 19/12*   (2014.01)
(Continued)

(52) U.S. Cl.
CPC ............. *H04N 19/61* (2014.11); *H04N 19/12* (2014.11); *H04N 19/13* (2014.11);
(Continued)

(58) Field of Classification Search
None
See application file for complete search history.

(56) References Cited

U.S. PATENT DOCUMENTS 8,451,904 B2 *  5/2013  Reznik .................. G06F 17/147
                                              375/240.2
8,885,701 B2   11/2014  Saxena et al.
(Continued)

FOREIGN PATENT DOCUMENTS

CN   103098473 A   5/2013
CN   103329523 A   9/2013
(Continued)

OTHER PUBLICATIONS

Arrufat, Adria et al., "Mode-Dependent Transform Competition for HEVC", IEEE International Conference on Image Processing (ICIP), 2015, pp. 1598-1602.
(Continued)

*Primary Examiner* — Mohammed Jebari
(74) *Attorney, Agent, or Firm* — NIXON & VANDERHYE P.C.

(57) ABSTRACT

The coding efficiency of predictive picture codecs using transform-based residual coding is enhanced by allowing the codec to switch between a set of transforms for the sake of the transform-based residual coding. It turned out that even when using explicit signaling from encoder to decoder in order to signal the actual transform to be used out of the set of transforms from encoder to decoder, an increase in coding efficiency may result. Alternatively, the switching between the set of transforms may be performed without explicit
(Continued)

signaling at all, or using a combination of explicit signaling and some sort of prediction of the switching.

36 Claims, 9 Drawing Sheets

(51) Int. Cl.
    *H04N 19/13*     (2014.01)
    *H04N 19/157*     (2014.01)
    *H04N 19/176*     (2014.01)
    *H04N 19/463*     (2014.01)
    *H04N 19/625*     (2014.01)
(52) U.S. Cl.
    CPC ......... *H04N 19/157* (2014.11); *H04N 19/176* (2014.11); *H04N 19/463* (2014.11); *H04N 19/625* (2014.11)

(56) References Cited

U.S. PATENT DOCUMENTS

| | | | |
|---|---|---|---|
| 2009/0157785 A1* | 6/2009 | Reznik | G06F 17/147 708/402 |
| 2010/0329329 A1* | 12/2010 | Reznik | G06F 17/147 375/240.2 |
| 2011/0274164 A1* | 11/2011 | Sole | H04N 19/119 375/240.12 |
| 2012/0008675 A1 | 1/2012 | Karczewicz et al. | |
| 2012/0170649 A1 | 7/2012 | Chen et al. | |
| 2012/0177108 A1* | 7/2012 | Joshi | H04N 19/625 375/240.03 |
| 2012/0201303 A1* | 8/2012 | Yang | H04N 19/61 375/240.14 |
| 2013/0101048 A1* | 4/2013 | Lee | H04N 19/134 375/240.19 |
| 2013/0330015 A1 | 12/2013 | Shimauchi et al. | |
| 2016/0021395 A1 | 1/2016 | Sole et al. | |
| 2016/0219290 A1* | 7/2016 | Zhao | H04N 19/122 |
| 2017/0094313 A1* | 3/2017 | Zhao | H04N 19/122 |
| 2018/0091817 A1* | 3/2018 | Sole | H04N 19/122 |
| 2018/0262777 A1* | 9/2018 | Filippov | H04N 19/12 |

FOREIGN PATENT DOCUMENTS

| | | | |
|---|---|---|---|
| EP | 2493197 A1 | 8/2012 | |
| EP | 2991352 A1 | 3/2016 | |
| JP | 2012516625 A | 7/2012 | |

OTHER PUBLICATIONS

Arrufat, Adria et al., "Non-Separable Mode Dependent Transforms for Intra Coding in HEVC", IEEE Visual Communications and Image Processing Conference, Dec. 2014, pp. 61-64.

Arrufat, Adria et al., "Rate-Distortion Optimised Transform Competition for Intra Coding in Hevc", IEEE Visual Communications and Image Processing Conference, Dec. 2014, pp. 73-76.

Bossen, Frank, "Common Test Conditions and Software Reference Configurations", Document JCTVC-L1100 of JCT-VC, Jan. 14-23, 2013, pp. 1-4.

Britanak, Vladimir et al., "Discrete Cosine and Sine Transforms: General Properties, Fast Algorithms and Integer Approximations", Oxford: Academic Press, 2007, pp. 1-359.

Budagavi, Madhukar et al., "Core Transform Design in the High Efficiency Video Coding (HEVC) Standard", IEEE Journal of Selected Topics in Signal Processing, vol. 7, No. 6, Dec. 2013, pp. 1029-1041.

Chen, Jianle et al., "Coding Tools Investigation for Next Generation Video Coding Based on HEVC", [Online]. Available: http://dx.doi.org/10.1117/12.2193681, Proc. SPIE Applications of Digital Image Processing XXXVIII, vol. 9599, Sep. 22, 2015, pp. 95991B-95991B-9.

Effros, Michelle et al., "Suboptimality of the Karhunen-Leove transform for transform coding", IEEE Transactions on Information Theory, vol. 50, No. 8, Aug. 2004, pp. 1605-1619.

Gabriellini, Andrea et al., "Adaptive Transform Skipping for Improved Coding of Motion Compensated Residuals", BBC Research & Development White Paper, WHP 246, Signal Processing: Image Communication, vol. 28, No. 3, pp. 1-19, Mar. 2013. [Online]. Available: http://www.sciencedirect.com/science/article/pii/S0923596512002093.

Goyal, Vivek K., "Theoretical Foundations of Transform Coding", IEEE Signal Processing Magazine, vol. 18, No. 5, Sep. 2001, pp. 9-21.

Huang, Yu-Wen et al., "A Technical Description of MediaTek's Proposal to the JCT-VC CfP", Joint Collaborative Team on Video Coding (JCT-VC) of ITU-T SG16 WP3 and ISO/IEC JTC1/SC29/WG11, Document: JCTVC-A109, Dresden, Germany, Apr. 15-23, 2010, pp. 1-41.

Karczewicz, M et al., "Study of Coding Efficiency Improvements Beyond HEVC", Qualcomm Incorporated, ISO/IEC JTC1/SC29/WG11, MPEG2015/M37102, XP030065470, Oct. 19-12, 2015, 13 pages.

Martucci, Stephen, "Symmetric Convolution and the Discrete Sine and Cosine Transforms", IEEE Transactions on Signal Processing, 42:5, May 1992, pp. 1038-1051.

Saxena, Ankur et al., "DCT/DST-Based Transform Coding for Intra Prediction in Image/Video Coding", IEEE Transactions on Image Processing, vol. 22, No. 10, Oct. 2013, pp. 3974-3981.

Sze, V., et al., editors, "High Efficiency Video Coding (HEVC)", Integrated circuit and systems, algorithms and architectures, Springer International Publishing, 2014, pp. 49-90.

Sullivan, Gary J. et al., "Overview of the high efficiency video coding (HEVC) standard", IEEE Transactions on Circuits and Systems for Video Technology, 22(12), Dec. 2012, pp. 1649-1668.

Zou, Feng et al., "Rate-Distortion Optimized Transforms Based on the Lloyd-Type Algorithm for Intra Block Coding", IEEE Journal of Selected Topics in Signal Processing, vol. 7, No. 6, Dec. 2013, pp. 1072-1083.

Chen Jianle et al., "Algorithm Description of Joint Exploration Test Model 3", Joint Video Exploration Team (JVET) of ITU-T SG 16 WP 3 and ISO/IEC JTC 1/SC 29/WG 11 3rd Meeting: Geneva, CH, May 26-Jun. 1, 2016, [JVET- C1001_v1], Jul. 2, 2016, JVET-C1001 (version 1), pp. 20-22.

Guo, Liwei et al., "Test of Transform Selection for Inter-Layer Texture Prediction on SMuC 0.1.1", Joint Collaborative Team on Video Coding (JCT-VC) of ITU-T SG 16 WP 3 and ISO/IEC JTC 1/SC 29/WG 11 12th Meeting: Geneva, CH, Jan. 14-23, 2013, [JCTVC-L0330], Jan. 18, 2013,JCTVC-L0330 (version 2), pp. 1-3.

Lorcy, V et al., "Proposed improvements to the Adaptive multiple Core transform", Joint Video Exploration Team (JVET) of ITU-T SG 16 WP 3 and ISO/IEC JTC 1/SC 29/WG 11 3rd Meeting: Geneva, CH, May 26-Jun. 1, 2016, [JVET-C0022], May 19, 2016, JVET-C0022 (version 3), pp. 1-4.

Chen, Jianle, et al., "Algorithm Description of Joint Exploration Test Model 3", Joint Video Exploration Team (JVET), JVET-C1001_v1, Jul. 2, 2016, pp. 1-35 (already cited: pp. 20-22), 2016.

Chen, J., et al., "Algorithm Description of Joint Exploration Test Model 2", JVET of ITU-T SG 16 WP 3 and ISO/IEC JTC 1/SC 29/WG 11, 2nd Meeting: San Diego, USA, Feb. 20-26, 2016.

\* cited by examiner

IMAGE DATA COMPRESSION USING SWITCHING BETWEEN A SET OF TRANSFORMS

CROSS-REFERENCES TO RELATED APPLICATIONS

This application is a continuation of copending International Application No. PCT/EP2017/067708, filed Jul. 13, 2017, which is incorporated herein by reference in its entirety, and additionally claims priority from European Application No. EP 16179405.2, filed Jul. 14, 2016, which is incorporated herein by reference in its entirety.

BACKGROUND OF THE INVENTION

The present application is concerned with predictive picture coding using transform-based residual coding such as, for example, hybrid video coding.

Many compression techniques and standards are known so far. Many still picture codecs, for example, use a certain spectral transform in order to decorrelate the samples to be coded. In video codecs, spectral transforms are often used in order to decorrelate the residual samples representing the prediction residual which, in turn, may have been obtained using intra-coding, i.e. spatially, or inter-coding, such as by temporal prediction.

For example, in a block based hybrid video coder standard like H.264/Advanced Video Coding (AVC) and H.265/High Efficiency Video Coding (HEVC), pictures in a video sequence are divided into blocks and then each block is spatially or temporally predicted. At that point, the residual signal is derived as the difference between the original samples of the block and its prediction [1]. Afterwards, transform, quantization and entropy coding methods are employed to further reduce the redundancy of residuals.

Particularly, in the case of HEVC the transform stage is carried out by performing a 2-D separable Discrete Sine Transform (DST) Type VII (DST-VII) for the 4×4 intra-predicted blocks and a 2-D separable Discrete Cosine Transform (DCT) Type II (DCT-II) for all other blocks [1]. In addition, a method that skips the transform step and directly quantizes the residual samples in the spatial domain is available at the encoder too, although this mode is restricted to 4_4 blocks [1].

The reason behind the use of the DCT-II as the main transform in image and video coding applications lies in the utilization of the first order stationary Markov Process to model the residual signals. The Karhunen-Loève Transform (KLT) is the optimal transform for such a process and the DCT-II basis vectors are very close to those of the KLT when the correlation factor is very high [2]. Besides, unlike the KLT, the DCT-II has the advantage of being a signal-independent transform that can be implemented in 2 dimensions (rows and columns) in a separable way using fast algorithms [2].

Nevertheless, as it has been pointed out in [3] and [4], the KLT is not necessarily the optimal transform in a ratedistortion sense in general. This fact questions its suitability and, by extension, the suitability of the DCT-II as the main transform, especially in the case of intra-predicted residuals [5].

Given a certain block, intra prediction is carried out in HEVC by extrapolating the decoded boundary samples of the neighbouring blocks following certain patterns, namely 33 angular modes and a DC and a planar modes [1]. To improve the intra coding process, in this paper we develop a method that allows the encoder to test different transforms from a given set in the rate-distortion loop for each Transform Unit (TU). The one that minimizes the rate-distortion cost is then signaled to the decoder. The new tranforms are separable and they are constructed by applying first a 1D transform on the rows of the TB and then another 1D transform on its columns. The one-dimensional transforms available are members of the family of the DCT-II and the DST-VII known as Discrete Trigonometric Transforms (DTTs) and the Identity Transform (IT), which is equivalent to the previously mentioned transform skip mode of HEVC.

Various proposals have been made in the literature to improve the transform coding performance of an HEVC encoder. They show that it is possible to achieve bit rate reductions by applying different combinations of distinct transforms to intra-predicted residual blocks.

Since HEVC supports 35 Intra Prediction Modes (IPMs) altogether, different Mode Dependant Directional Transforms (MDDT) algorithms have been proposed. In MDDT, the selection of the transform used to map residuals depends on the IPMs. For example, in [6] the authors derived a scheme that chooses combinations of the DCT-II and the DST-VII as the row and column transforms according to the IPMs. Remarkably, their work led to the introduction of the DSTVII as the core transform for 4×4 intra-predicted blocks in HEVC.

On the other hand, reference [7] proposed another MDDT approach in which one Rate-Distortion Optimized Transform (RDOT) is utilized for each IPM. This means that the coefficients of each transform were trained offline using an algorithm designed to minimize a rate-distortion criterion.

However, as indicated by [5], residuals coming from the same IPM may have very different statistics and therefore a single transform for each IPM is insufficient to maximize the energy compaction of highly varying signals. Hence, the work accomplished by [5] and [8] implements a set of data-driven RDOTs that are usable for all IPMs. Accordingly, the encoder has to test all available transforms and choose the one that yields the lowest rate-distortion cost. Afterwards, this decision has to be sent to the decoder with the consequent overhead bits.

Finally, the authors of [9] and [10] combine both approaches and develop algorithms that provide a different set of multiple transforms for each IPM. The research carried out in [9] focuses again in the use of data-driven RDOTs, whereas the work of [10] implements a system that adopts different sets of DTTs.

It would be favorable to have a concept at hand which further increases the coding efficiency of such predictive picture coding techniques applying transform-based residual coding.

SUMMARY

An embodiment may have an apparatus for predictively decoding a picture from a data stream, wherein the apparatus is configured to decode a prediction residual signal of the picture from the data stream and subject the prediction residual signal to spectral-to-spatial transforming with supporting switching between a set of transforms in spectral-to-spatial transforming the prediction residual signal.

Another embodiment may have an apparatus for predictively encoding a picture into a data stream, wherein the apparatus is configured to subject a prediction residual signal of the picture to spatial-to-spectral transforming with supporting switching between a set of transforms in spatialto-spectral transforming the prediction residual signal, and to encode the prediction residual signal into the data stream.

Another embodiment may have a data stream having a picture encoded thereinto by use of predictive coding and spatial-to-spectral transform coding of a prediction residual signal wherein a transform underlying the spatial-to-spectral transform coding of the prediction residual signal switches between a set of transforms.

According to another embodiment, a method for predictively decoding a picture from a data stream may have the steps of: decoding a prediction residual signal of the picture from the data stream and subjecting the prediction residual signal to spectral-to-spatial transforming with supporting switching between a set of transforms in spectral-to-spatial transforming the prediction residual signal.

According to another embodiment, a method for predictively encoding a picture into a data stream may have the steps of: subjecting a prediction residual signal of the picture to spatial-to-spectral transforming with supporting switching between a set of transforms in spatial-to-spectral transforming the prediction residual signal, and encoding the prediction residual signal into the data stream.

According to another embodiment, a computer program may have a program code for performing, when running on a computer, the inventive methods.

The present invention is based on the finding that the coding efficiency of predictive picture codecs using transform-based residual coding may be enhanced by allowing the codec to switch between a set of transforms for the sake of the transform-based residual coding. It turned out that even when using explicit signaling from encoder to decoder in order to signal the actual transform to be used out of the set of transforms from encoder to decoder, an increase in coding efficiency may result. Alternatively, the switching between the set of transforms may be performed without explicit signaling at all, or using a combination of explicit signaling and some sort of prediction of the switching.

In accordance with an embodiment of the present application, the switching between the set of transforms is performed in units of segments into which the picture is subdivided. Although the overhead associated with, for instance, an optional explicit signalization of the switching from encoder to decoder, may increase by performing the switching in units of segments, the coding efficiency may be further increased by taking advantage of the fact that different portions of pictures tend to show better decorrelation behavior for different transforms in transform-based residual coding/decoding.

In accordance with an embodiment, the switching between transforms for transform-based residual coding is restricted to intra-coded segments, i.e. segments or blocks coded using an intra-coding mode, while for inter-coded segments, i.e. segments coded using an inter-coding mode, such as coded using temporal prediction, inter-view prediction and/or inter-layer prediction, one transform is applied in transform-based residual coding/decoding statically or steadily, or a switching between a different set of transforms is used for the latter inter-coded segments. Doing so may further increase the coding efficiency as an optional explicit signaling in order to control the switching among the set of transforms, for transform-based residual coding/decoding and its associated signaling overhead is, by this measure, restricted to segments for which the prediction residual signal tends to have more energy than compared to inter-coded segments so that the coding gain achievable by the switching between the set of transforms and transform-based residual coding/decoding may be higher for intra-coded segments when compared to inter-coded segments assuming that any optional signaling overhead is equal among intra-coded segments and inter-coded segments, respectively.

In accordance with an embodiment, explicit signaling is used for the switching between the transforms in transform-based residual coding/decoding. The transform class signalization may allow, for each segment for which the switching between transforms is applied, in a manner independent from the segment's coding mode, that every transform of the set of transforms is selectable. In other words, the transform class signalization contained in the data stream for the segments may be subjective, i.e. the image of the mapping from the domain of the values the transform class signalization may assume, coincides with the set of transforms irrespective of the coding mode of the respective segment, such as the intra-coding mode in case of intra-coded segments. The intra-coding mode may, for instance, include directional modes according to which the intra-coded segment is predicted by spatially extrapolating a neighborhood of the respective intra-coded segment into the respective intra-coded segment so as to obtain the prediction thereof relative to which the prediction residual signal subject to a transform-based residual coding/decoding forms the prediction residual. It has been found out that the additional overhead which comes along with the subjective nature of the transform class signalization is overcompensated by the increase in coding efficiency by way of the feasibility to choose the optimum transform for an optimum decorrelation of the prediction residual signal.

In accordance with an embodiment, the transform class signalization is coded using context-based entropy coding/decoding using a context which depends on an intra-coding mode of the respective intra-coded segment. By this measure, a subjective nature of the explicit signalization may be achieved while nevertheless taking advantage of any statistical dependency on the optimum transform among this set of transforms on the one hand and the intra-coding mode chosen for the respective intra-coded segment on the other hand.

In accordance with a further embodiment, the transform class signalization may comprise a prefix portion and a suffix portion. The prefix portion enables selecting the transform by spatial and/or temporal prediction. If spatial and/or temporal prediction is signaled to be used by the prefix portion, the transform class signalization does not comprise, i.e. goes without, the suffix portion. If spatial and/or temporal prediction is signaled to not be used, the suffix portion of the transform class signalization signals which transform among the set of transforms is to be used, either among the ones except for the predicted ones, or among all in order to avoid a dependency of the mapping of the suffix portion to the set of transforms on the spatial and/or temporal prediction. Advantageously, the partitioning into prefix and suffix portions may additionally increase the efficiency of the transform class signalization.

In accordance with an embodiment, the set of transforms comprises different pairs of one of a set of horizontal transforms and one of a set of vertical transforms. The set of horizontal and vertical transforms may be composed of the same transform times. That is, the set of transforms may comprise concatenations of a first one of a set of one-dimensional transforms applied horizontally and a second one of the same set of one-dimensional transforms applied vertically. Switching between the transforms in transform-based residual coding/decoding thus enables a direction-specific adaptation of the transform so as to specifically adapt the decorrelating characteristic separately along the vertical direction and horizontal direction, respectively. It turns out that the additional overhead resulting from the increased number of transforms in the set of transforms is more than compensated by the coding efficiency increase resulting from the ability to find an optimum decorrelation of the samples of the prediction residual signal.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
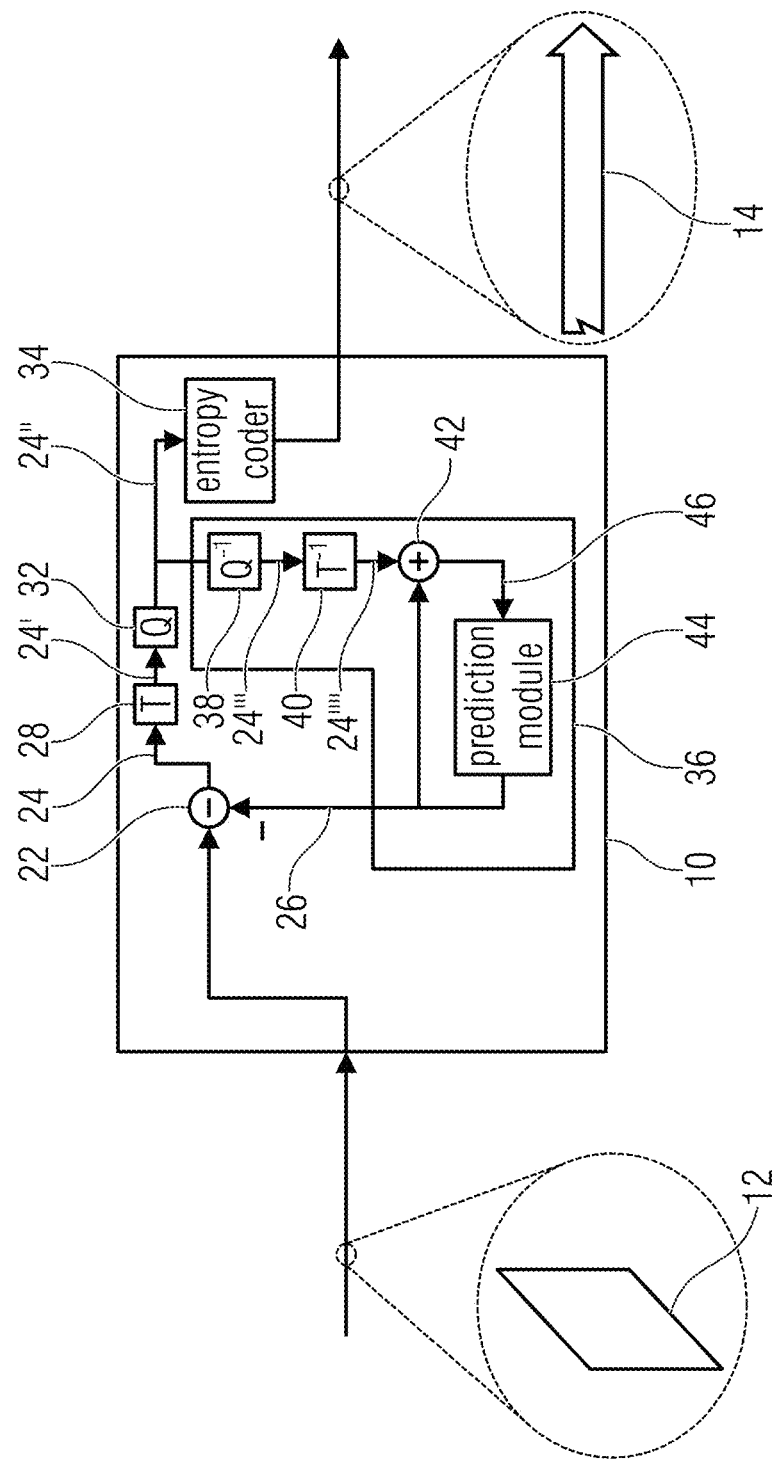
FIG. 1 shows a block diagram of an apparatus for predictively coding a picture in accordance with an embodiment of the present invention.
Figure 2:
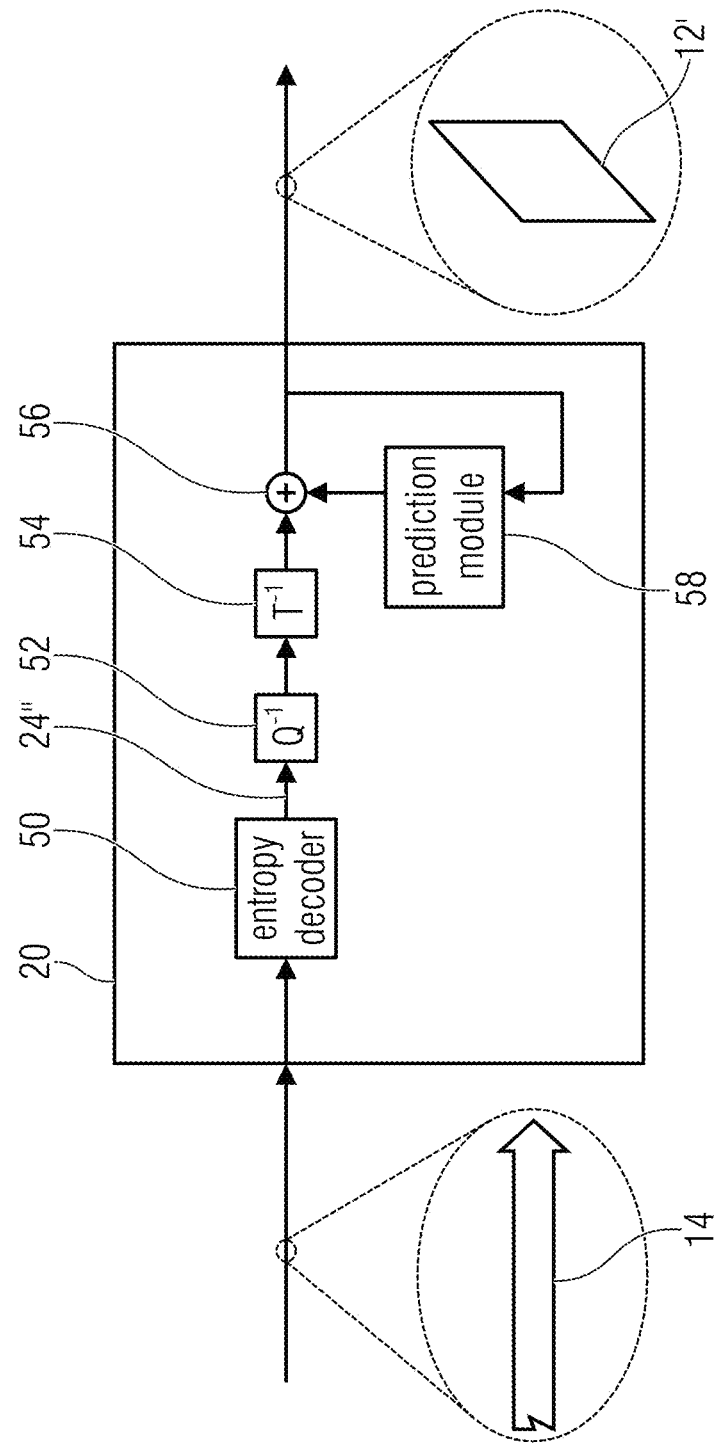
FIG. 2 shows a block diagram of an apparatus for predictively decoding a picture in accordance with an embodiment of the present invention, which fits to the apparatus of FIG. 1.

FIG. 1 shows an apparatus for predictively coding a picture 12 into a data stream 14 using transform-based residual coding. The apparatus, or encoder, is indicated using reference sign 10. FIG. 2 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by decoder 20 deviates from picture 12 originally encoded by apparatus 10 in terms of coding loss introduced by a quantization of the prediction residual signal.

The encoder 10 is configured to subject the prediction residual signal to spatial-to-spectral transformation and to encode the prediction residual signal, thus obtained, into the data stream 14. As described later on, the encoder supports switching between a set of transforms in spatial-to-spectral transforming the prediction residual signal. Likewise, the decoder 20 is configured to decode the prediction residual signal from the data stream 14 and subject the prediction residual signal thus obtained to spectral-to-spatial transformation. Like the encoder 10, the decoder 20 supports switching between the set of transforms in spectral-to-spatial transforming the prediction residual signal.

Internally, the encoder 10 may comprise a prediction residual signal former 22 which generates a prediction residual signal 24 so as to measure a deviation of a prediction signal 26 from the original signal, i.e. the picture 12. The prediction residual signal former 22 may, for instance, be a subtractor which subtracts the prediction signal from the original signal, i.e. picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction residual 26 is generated by a prediction stage 36 of encoder 10 on the basis of the prediction residual signal 24" decoded into, and decodable from, data stream 14. To this end, the prediction stage 36 may internally, as is shown in FIG. 1, comprise a dequantizer 38 which dequantizes prediction residual signal 24" so as to gain spectral-domain prediction residual signal 24''', which corresponds to signal 24' except for quantization loss, followed by an inverse transformer 40 which subjects the latter prediction residual signal 24''' to an inverse transformation, i.e. a spectral-to-spatial transformation, to obtain prediction residual signal 24'''', which corresponds to the original prediction residual signal 24 except for quantization loss. A combiner 42 of the prediction stage 36 then recombines, such as by addition, the prediction signal 26 and the prediction residual signal 24'''' so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial and/or temporal prediction.

Likewise, decoder 20 may be internally composed of components corresponding to, and interconnected in a manner corresponding to, prediction stage 36. In particular, entropy decoder 50 of decoder 20 may entropy decoder the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 2, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion. For example, encoder 10 and decoder 20 and the corresponding modules 44, 58, respectively, may support different prediction modes such as intra-coding modes and inter-coding modes. The granularity at which encoder and decoder switch between these prediction modes may correspond to a subdivision of picture 12 and 12', respectively, into coding segments or coding blocks. In units of these coding segments, for instance, the picture may be subdivided into segments being intra-coded and segments inter-coded. Intra-coded segments are, for instance, predicted on the basis of a spatial, already coded/decoded neighborhood of the respective segment. Several intra-coding modes may exist and be selected for a respective intra-coded segment including, for instance, directional intra-coding modes according to which the respective segment is filled by extrapolating the sample values of the neighborhood along a certain direction which is specific for the respective directional intra-coding mode, into the respective intra-coded segment. The intra-coding modes may, or instance, also comprise one or more further modes such as ADC coding mode, according to which the prediction for the respective intra-coded segment assigns a DC value to all samples within the respective intra-coded segment, and/or a planar intra-coding mode according to which the prediction of the respective segment is approximated or determined to be a spatial distribution of sample values described by a two-dimensional linear function over the sample positions of the respective intra-coded segment. Compared thereto, inter-coded segments may be predicted, for instance, temporally. For inter-coded segments, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded segment. This means, in addition to the residual signal coding comprised by data stream 14, such as the entropy-coded transform coefficient levels representing the quantized spectral-domain prediction residual signal 24'', data stream 14 may have encoded thereinto coding mode parameters for assigning the coding modes to the various segments, prediction parameters for some of the segments, such as motion parameters for inter-coded segments, and optional further parameters such as parameters controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 3:
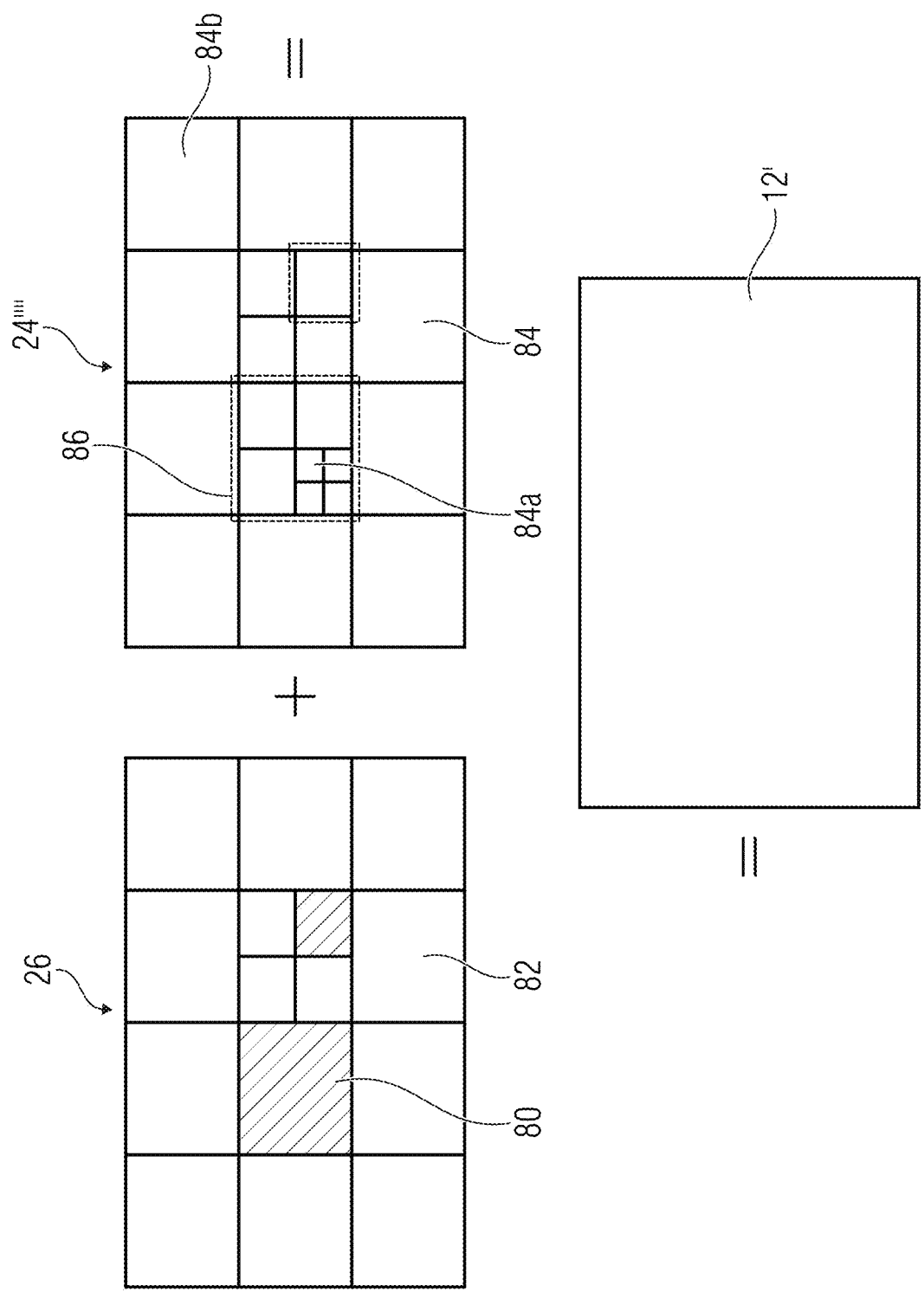
FIG. 3 shows a schematic diagram illustrating an example for a relationship between the prediction residual signal, the prediction signal and the reconstructed signal so as to illustrate possibilities of setting subdivisions for coding mode selection, transform selection and transform performance, respectively.

FIG. 3 illustrates the relationship between the reconstructed signal, i.e. the reconstructed picture 12', on the one hand, and the combination of the prediction residual signal 24'''' as signaled in the data stream, and the prediction signal 26, on the other hand. As already denoted above, the combination may be an addition. The prediction signal 26 is illustrated in FIG. 3 as a subdivision of the picture area into intra-coded segments which are illustratively indicated using hatching, and inter-coded segments which are illustratively indicated not-hatched. The subdivision may be any subdivision, such as a regular subdivision of the picture area into rows and columns of blocks or segments, or a multi-tree subdivision of picture 12 into leaf segments of varying size, such as a quadtree subdivision or the like, into segments, wherein a mixture thereof is illustrated in FIG. 3 where the picture area is first subdivided into rows and columns of tree-root blocks which are then further subdivided in accordance with a recursive multi-tree subdivisioning. Again, data stream 14 may have an intra-coding mode coded thereinto for intra-coded segments 80, which assigns one of several supported intra-coding modes to the respective intra-coded segment. For inter-coded segments 82, the data stream 14 may have one or more motion parameters coded thereinto. Generally speaking, inter-coded segments 82 are not restricted to being temporally coded. Alternatively, inter-coded segments 82 may be any segment predicted from previously coded portions beyond the current picture 12 itself, such as previously coded pictures of a video to which picture 12 belongs, or picture of another view or an hierarchically lower layer in the case of encoder and decoder being scalable encoders and decoders, respectively. The prediction residual signal 24'''' in FIG. 3 is also illustrated as a subdivision of the picture area into segments 84. These segments might be called transform segments in order to distinguish same from the coding segments 80 and 82. In effect, FIG. 3 illustrates that encoder 10 and decoder 20 may use two different subdivisions of picture 12 and picture 12', respectively, into segments, namely one subdivisioning into coding segments 80 and 82, respectively, and another subdivision into segments 84. Both subdivisions might be the same, i.e. each coding segment 80 and 82, may concurrently form a transform segment 84, but FIG. 3 illustrates the case where, for instance, a subdivision into transform segments 84 forms an extension of the subdivision into coding segments 8β0/82 so that any border between two segments of segments 80 and 82 overlays a border between two segments 84, or alternatively speaking each segment 80/82 either coincides with one of the transform segments 84 or coincides with a cluster of transform segments 84. However, the subdivisions may also be determined or selected independent from each other so that transform segments 84 could alternatively cross segment borders between segments 80/82. As far as the subdivision into transform segments 84 is concerned, similar statements are thus true as those brought forward with respect to the subdivision into segments 80/82, i.e. the segments 84 may be the result of a regular subdivision of picture area into segments/blocks, arranged in rows and columns, the result of a recursive multi-tree subdivisioning of the picture area, or a combination thereof or any other sort of segmentation. Just as an aside, it is noted that segments 80, 82 and 84 are not restricted to being of quadratic, rectangular or any other shape.

FIG. 3 illustrates that the combination of the prediction signal 26 and the prediction residual signal 24'''' directly results in the reconstructed signal 12'. However, it should be noted that more than one prediction signal 26 may be combined with the prediction residual signal 24'''' to result into picture 12' in accordance with alternative embodiments.

In FIG. 3, the transform segments 84 shall have the following significance. Transformer 28 and inverse transformer 54 perform their transformations in units of these transform segments 84. For instance, many codecs use some sort of DST or DCT for all transform blocks 84. Some codecs allow for skipping the transformation so that, for some of the transform segments 84, the prediction residual signal is coded in the spatial domain directly. However, in accordance with the embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform
DST-IV, where DST stands for Discrete Sine Transform
DCT-IV
Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)
Inverse DST-IV
Inverse DCT-IV
Identity Transformation (IT)

Further, more specific embodiments on which transforms could be supported by encoder 10 and decoder 20 are provided below. In any case, the set of supported transforms comprises, in any case, two spectral-to-spatial or spatial-to-spectral transforms while the inclusion of the identity transform or identity transformation is optional.

The switching between the various transforms enables an adaptation of the transform's decorrelation property to the actual needs. In accordance with the embodiments set forth in more detail below, the switching is performed in units of the transform segments 84 themselves. However, it should be noted that in accordance with a less sophisticated embodiment, it could also be that encoder 10 and decoder 20 switch between the various supported transforms in other units such as, for instance, in units of complete pictures, in units of slices of pictures which, in turn, may represent subsets composed of one or more of segments 84 or the like. That is, the details set forth below with respect to possible implementations of switching between the available transforms may be modified in that these details are applied to segments which differ from the transform segments in units of which the selected transform is finally applied at transformer 28 and inverse transformer 52, respectively.

Thus, with the embodiments described further below, encoder 10 and decoder 20 are configured to switch between available transforms of a set of available transforms in units of segments 84. Depending on whether a certain segment 84 is part of an intra-coded segment 80, i.e. its prediction signal is determined by intra-prediction, or whether same is part of, or overlays, an inter-coded segment 82, i.e. its prediction signal is determined using inter-coding mode, same shall be classified into intra-coded segments and inter-coded segments. In FIG. 3, intra-coded segments 84 are encircled using dashed lines 86 which indicate the position of the circumference of the intra-coded segments 80. In the following, intra-coded segments 84 are referenced using reference sign 84a, while inter-coded segments are indicated using reference sign 84b. For each of intra-coded segments and inter-coded segments 84, one representative is specifically indicated in FIG. 3.

The details set out in more detail below concern possible examples of how encoder 10 and decoder 20 could select the same transform for each of segments 84, i.e. the forward transform and the corresponding inverse transform, respectively. In the embodiments described further below, explicit signalization is used to this end, but it should be noted that alternatively, a pure inherent signalization might be used to as well. In the latter case, for instance, encoder 10 and decoder 20 may, for each segment 84, predict or derive the selected transform out of the available set of transforms for each segment 84 by way of information contained in the data stream 14, which information is however actually intended for other use. For example, the transform selected for a certain segment 84 could be determined by encoder 10 and decoder 20 by spatially predicting the transform to be selected on the basis of the selection made for neighboring segments 84. Additionally or alternatively, the coding mode of the current segment 84 and/or the coding mode of neighboring segments could be taken into account in order to select a transform for a respective segment out of the available set of transforms. A further note relates to the fact that the following embodiments restrict the switching between the various transforms merely with respect to intra-coded segments 84a, while merely one spectral-to-spatial transform and its corresponding spatial-to-spectral transform is available for inter-coded segments 84b, with or without the opportunity to skip the transform at all with respect to the inter-coded segments 84b. That is, while the embodiments described below relate to the specific embodiment of restricting transform switching to intra-coded segments 84a, these embodiments may be modified to the extent that this transform switching is applied also to inter-coded segments.

Figure 4:
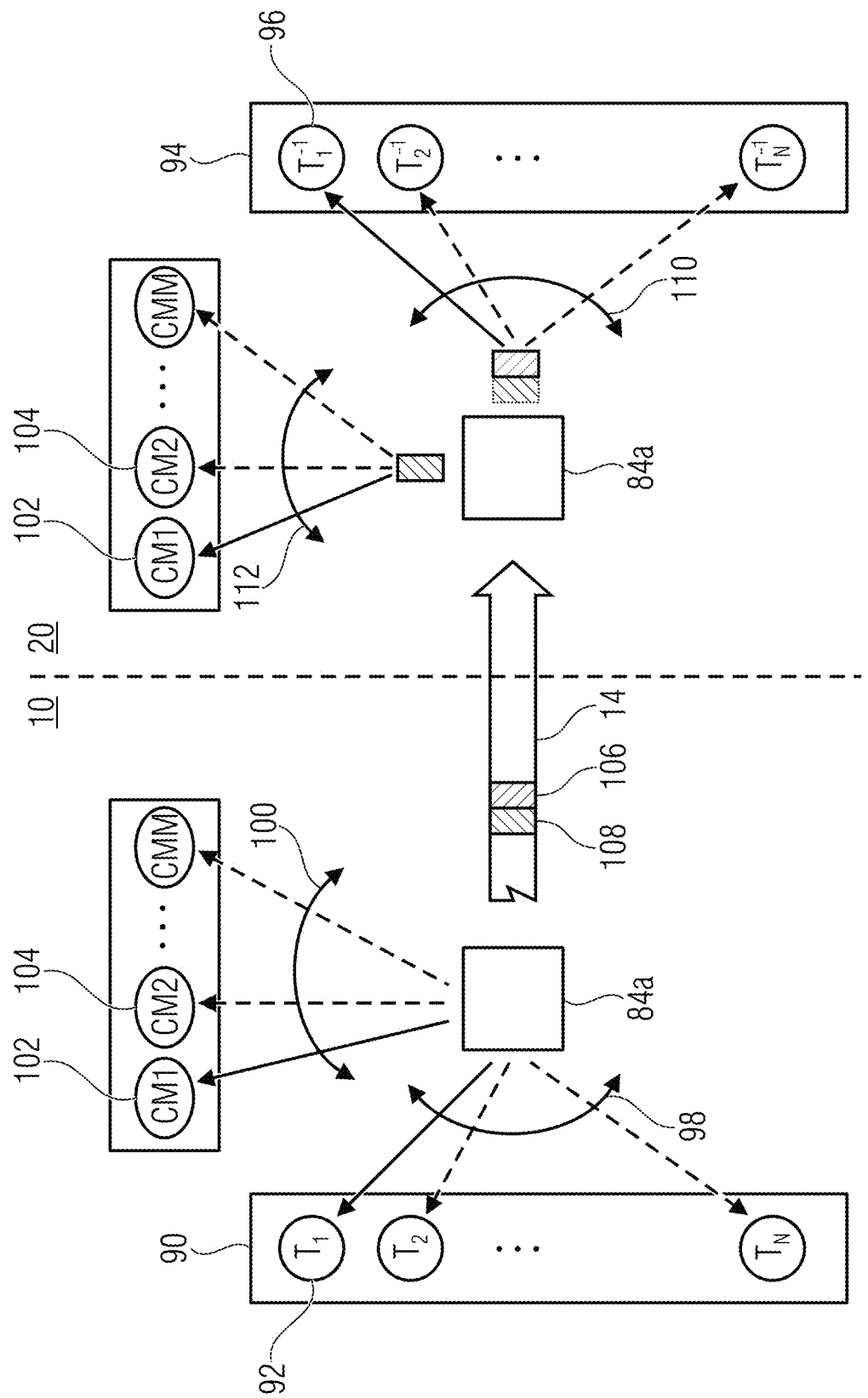
FIG. 4 shows a schematic diagram illustrating an example for using explicit signaling in transform switching.

FIG. 4 illustrates the way encoder 10 and decoder 20 synchronously switch between available transforms for transform-based residual coding/decoding in units of segments 84a. FIG. 4 illustrates at 90 the set of transforms 92 supported by the encoder 10. FIG. 4 illustrates that there are N transforms $T_i$ with i=1 . . . N. In the embodiments described hereinafter N is 16. However, as already denoted above, other examples may apply. The corresponding set 94 of transforms 96 between which the decoder 20 supports switching for segments 84a is shown on the other side of FIG. 4. That is, transform $T_1^{-1}$ is the inverse of transform $T_1$ and generally, transform $T_i^{-1}$ is the inverse of transform $T_i$ with i=1 . . . N. In the following, the sets 90 and 94 are not specifically distinguished from one another while knowing that the transforms 96 of set 94 are simply the inverse of the transforms 92 of set 90.

FIG. 4 illustrates that the encoder 10 selects, for a certain segment 84a, one of transforms 92. The selection is illustrated by a curved double headed arrow 98. The selection 98 may be performed by the encoder 10 using some optimization criterion as already explained above. The embodiment of FIG. 4 illustrates that the encoder 10 is designed such that for each segment 84a, the complete set 90, i.e. every transform 92 of set 90, may be selected 98. Even further, FIG. 4 seeks to illustrate that in accordance with an embodiment of the present invention, the feasibility to select any/every transform 92 of set 90 for each of segments 84a shall apply irrespective of the selection 100 of the coding mode for the respective segment 84a among the available set 102 of intra-coding modes 104 supported by encoder 10 and decoder 20, respectively. The intra-coding modes 104 are indicated in FIG. 4 using CM1, CM2, . . . CMM. The number M of intra-coding modes may for instance be greater than 7 or even greater than 15. The intra-coding modes 104 may, as already denoted above, comprise directional modes and, optionally, one or more non-directional modes such as a DC mode and/or a planar mode. As decision 98 allows for a selection of any of the N transforms 92 of set 90 irrespective of selection 100, encoder 10 is able to assign to segment 84a any combination of the N×M combinations of an intra-coding mode 104 and transform 92. It should be emphasized, however, that the fact that any of transforms 92 may be selected for segment 84a irrespective of selection 100 among intra-coding modes 104 does not imply that selections 98 and 100 would be performed by encoder 10 independent from one another. Rather, encoder 10 will perform selections 98 and 100 in such a manner that the optimum combination of intra-coding mode 104 and transform 92 is assigned to, or signaled to be selected for, segment 84a.

The selection is signaled from encoder 10 for segment 84a by way of a transform class signalization 106 contained in the data stream 14 for the respective segment 84a. FIG. 4 illustrates the case that, in addition to the transform class signalization 106, data stream 14 also comprises an intra-coding mode signalization 108 for segment 84a. FIG. 4 also illustrates the selection of the transform 96 performed at the decoder 20 for segment 84a. The selection performed by the decoder 110 among transforms 96 is illustrated in FIG. 4 using double-headed arrow 110. The selection is performed depending on the transform class signalization 106. To this end, the decoder 20 maps a domain of values the transform class signalization 106 may assume, onto the set 94 of transforms 96 subjectively. That is, every transform 96 of set 94 has associated therewith by way of the mapping a corresponding value the transform class signalization 106 may assume. Naturally, the same mapping is used by the encoder 10 to set signalization 106. In a similar manner, decoder 20 uses, for instance, the intra-coding mode signalization 108 to select 112 the intra-coding mode 104 to be used for segment 84a within set 102. In case of the embodiment according to which the encoder 10 is able to select every transform 92 for segment 84a, irrespective of the selection 100 among the coding modes 104, the subjective nature of the mapping from the values which the transform class signalization 106 assumes to the transforms 96 of set 94 also applies irrespective the intra-coding mode selected 112 on the basis of the intra-coding mode signalization 108. However, it should be noted that the latter circumstance does not necessarily mean that the mapping applied by the decoder 20 to select 110 the transform 96 for segment 84a depending on the transform class signalization 106 would be independent from the intra-coding mode signalization 108. Rather, as explained in more detail below, the coding mode selection 112 performed for segment 84a may be taken into account by encoder 10 and decoder 20 to more efficiently transmit the transform class signalization 106 within data stream 14. For example, the intra-coding mode selected for segment 84a may be used to set a context in context-adaptively entropy coding the transform class signalization 106 and/or the transform class signalization may be transmitted using a variable length code with changing the mapping the codes of this variable length code, i.e. the values which the transform class signalization 106 may assume on the one hand, and the transforms 96 of set 94 on the other hand, depending on the intra-coding mode of segment 84.

Figure 5:
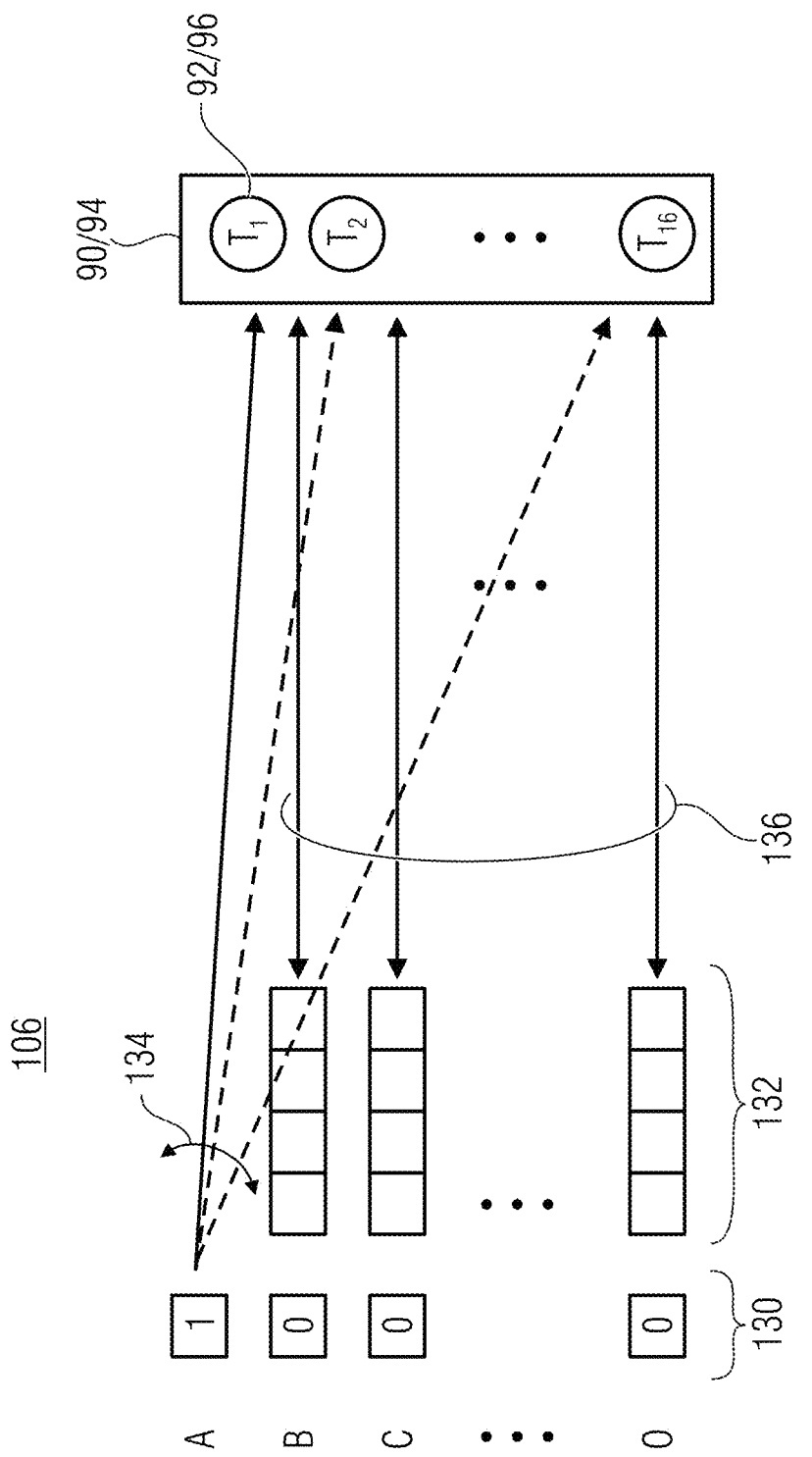
FIG. 5 shows a schematic diagram illustrating an example for an explicit signalization of the transform switching including prefix and suffix.
Figure 6:
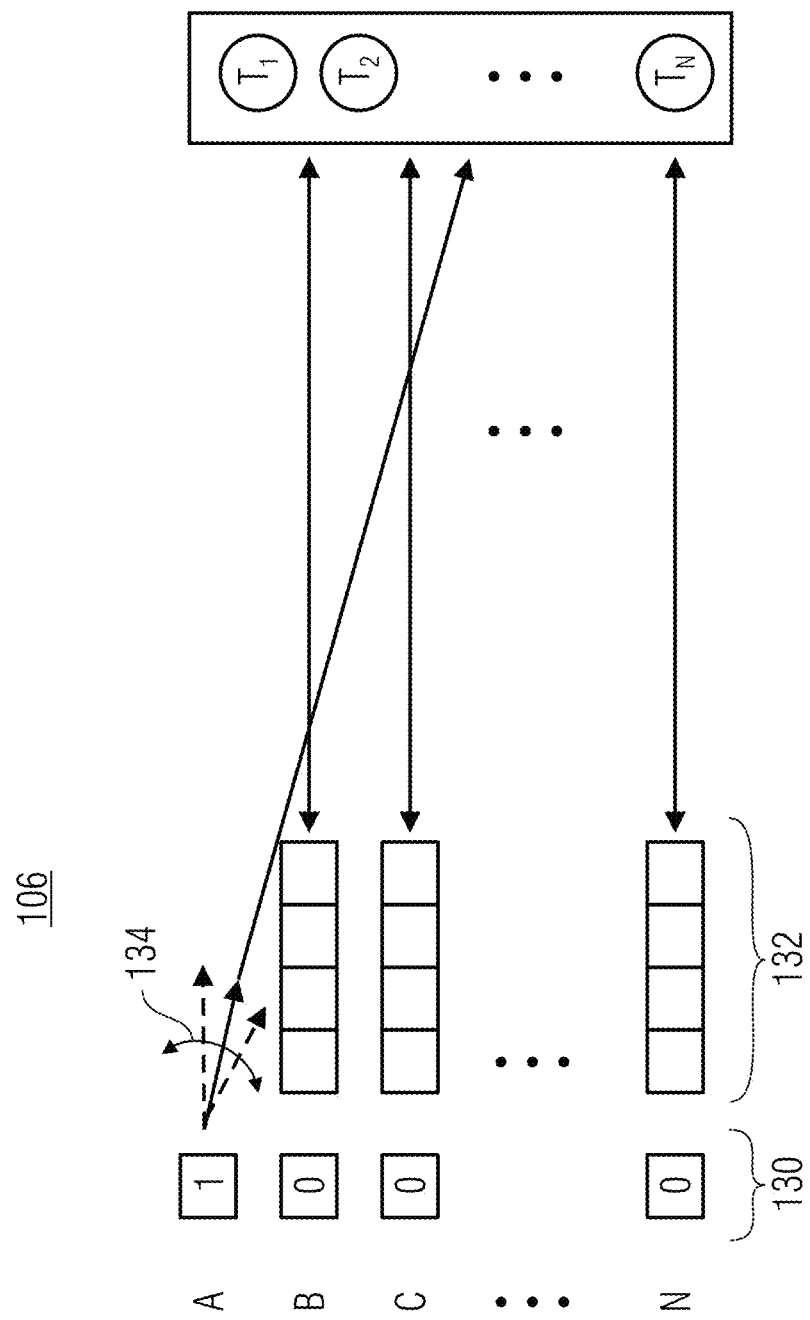
FIG. 6 shows a schematic diagram illustrating an example for an explicit signalization of the transform switching including prefix and suffix where the mapping from possible binarizations to transforms is bijective.

The latter aspects are described with respect to FIGS. 5 and 6. An embodiment where the transform class signalization is coded using a variable length code composed of a prefix 130 and a conditionally coded suffix 132. The values of the transform class signalization 106 are discriminated in FIG. 5 using capital letters A to O. That is, the number of values is, in the case of FIG. 5, exemplarily 17. The number N of transforms is exemplarily 16. In accordance with the embodiment of FIG. 5, the prefix 130 of signalization 106 assuming a first state, such as 1, indicates that the transform to be used for the segment 84a to which the transform class signalization 106 belongs, is to be selected using spatial and/or temporal prediction or on the basis of a characteristic signaled in the data stream 14 for the respective segment. For instance, in case of the prefix 130 assuming the first state, the selected transform 92/96 may be determined on the basis of the transforms selected for neighboring segments, additionally or alternatively, the prefix 130 assuming the first state is associated with, or indicates that the selected transform is to be determined on the basis of, a characteristic signaled in the data stream for the segment 84a to which the transform class signalization 106 belongs, such as the intra-coding mode signalization 108. In other words, the value A which corresponds to the prefix 130 assuming the first state 1, is variably associated with one of transforms 92/96 depending on the just-outlined spatial and/or temporal prediction and/or the characteristic with this variable association being indicated in FIG. 5 using a curved arrow 134. In case of the prefix 130 assuming the first state, the transform class signalization 106 does not comprise any suffix 132. All other values B to 0 of the transform class signalization 106 correspond to the transform class signalization 106 comprising prefix 130 and suffix 132 with the prefix assuming the other (second) state such as zero. In the example illustrated in FIG. 5, the suffix corresponds to a fixed-length binarization and the number of values corresponding to signalization 106 being composed of prefix 130 and suffix 132 equals N with each value corresponding to a different one of transforms 92/96. That is, the remaining values B to O except for value A are bijectively mapped onto transforms 92/96 of sets 90/94. This bijective mapping 136 is, for instance, fixed or independent from the transform associated with value A by way of the variable association 134.

FIG. 6 shows a variation of FIG. 5, according to which the number of values the transform class signalization 106 may assume is exactly N rather than N+1, as it was the case in FIG. 5, with values B to N being bijectively mapped onto the "remaining transforms", i.e. all transforms of set 90/94 minus the one variably associated with value A of the transform class signalization 106. In accordance with FIG. 6, the association or mapping 136 of those values of the transform class signalization 106 involving prefix 130 plus suffix 132, depends on the transform variably associated 134 with the prefix-only value of the transform class signalization 106.

In the following, implementations for implementing the embodiments described above, are set out below. As described so far, the above described embodiments involve a coding/decoding of a compressed video bitstream where various transforms are used to transform or inverse transform the prediction residual. The usage of various transforms as described in accordance with the embodiments may be restricted to intra-coded or intra-predicted segments, or may be extended to other segments too. If restricted to intra-coded segments, the above embodiments may include other segments by subject to the usage of one specific transform steadily for sake of transform-based residual de/coding, or the usage of a different set of transforms according to rules and dependencies which may be freely chosen. In any case, the selected transform in accordance with the embodiments of the present applications, is used to inverse transform a respective segment after inverse quantization, and to select the corresponding transform for transform-based residual coding before quantization.

As far as the set 90/94 of transforms 92/96 is concerned, the following is noted. Although not specifically outlined above, this set may comprise at least two transforms being different from one another with additionally comprising, or excluding, an identity transform. The at least two transforms may be any of a DCT and DST. Advantageously, the transforms 92 and 94 correspond to a concatenation of one-dimensional transforms, one applied horizontally and the other one applied vertically. In the embodiment described below, set 90/94 comprises transforms among which one involves the application of a one-dimensional transform vertically with remaining in spatial horizontally, and among which a second one involves applying the same dimensional transform horizontally, while remaining in spatial domain. Generally speaking, the specific embodiment described below uses a set of transforms, a set 90/94, being composed of different pairs of one horizontal transform and one vertical transform. In particular, the set of transforms is composed of concatenations of a first of a set of one-dimensional transforms applied horizontally and a second one of the same set of one-dimensional transforms applied vertically. The set of one-dimensional transforms consists of an identity transform or identity transformation and three discrete cosine/sine transforms. The number of discrete cosine/sine transforms may, however, also be any other number, such as one, two or even more than three.

As already denoted above, the transforms available at the encoder may be the following:
DCT-II (or DCT-III)
DST-IV
DCT-IV
Identity transformation (IT).

Obviously, the inverse transforms available at the decoder would then be the corresponding inverse transforms.

In other words, sets 90 and 94 denoted above would consist of an identity transform, a DCI-II, a DCT-IV and a DST-IV or an identity transform, a DCT-III, a DCT-IV and a DST-IV.

In accordance with an embodiment, set 90/94 comprises any possible combination of the above-mentioned four transforms applied to rows and columns, i.e. applied vertically and horizontally. Accordingly, according to this embodiment, the total number of possible combinations, i.e. the number N of transforms 92/96, is 16. Naturally, variations are feasible, however simulations reveal that the usage of any of these sets of 16 transforms results in improved coding efficiency.

In addition to the description brought forward above, it is noted that the switching between N transforms 92/96 may be supported by encoder 10 and decoder 20 for segments 84 of all sizes or for segments of a predetermined set of sizes only. If done for all sizes, the switching may be done independent from the segment size, including the signalization. If done for a predetermined set of sizes only, then, for instance, for segments 84 succeeding a predetermined size measured in, for instance, number of samples inherited by the respective segment, a default transform may be used at encoder and decoder, respectively, inevitably with or without allowing for bypassing any transform and remaining in the spatial domain instead.

As a further variant of the embodiments of FIGS. 5 and 6, it is noted that the transform class signalization 106 could alternatively be composed of a fixed-length syntax element only, i.e. merely the suffix 132 would represent the transform class signalization with a transform class signalization 106 thus being signaled using a fixed length code. The syntax element could be denoted transformClass. In the case of the specific examples of using 16 transforms in sets 90 and 94, the transform class signalization or syntax element transform class could comprise a fixed number of bins, namely four bins.

The four bins of the transform class syntax element, i.e. the bins of suffix 132 in the case of using the prefix 130 as well, or the fixed number of bins of the transform class signalization in the case of leaving away prefix 130, may be coded using context-adaptive binary arithmetic coding, i.e. CABAC. Any other entropy coding scheme which is context adaptive could be used as well. The context is chosen dependent on the intra-mode 104 selected for the respective segment 84 to which the syntax element transform class belongs and that is used to calculate the prediction residual signal of this segment 84. Such context dependency may allow a better adaption to the statistics of transform class.

As a first example (example 1), for instance, the decoder 20 may read 4 bins from bitstream 14 using the value $i_c$, with the value $i_c$ being the current intra-mode, i.e. the intra-coding mode selected for the segment 84 for which the 4 bins are read which form the transform class signalization. In other words, the decoder may use the value $i_c$ for indexing the context to be used for entropy decoding each bin $b_0 \ldots b_3$ of the transform class signalization 106. The following table shows the resulting context selection.

| Bin | Context Value |
|---|---|
| $b_0$ | $i_c$ |
| $b_1$ | $i_c$ |
| $b_2$ | $i_c$ |
| $b_3$ | $i_c$ |

In accordance with a further example (example 2), if the current intra mode is $i_c$, then the decoder can read 2 bins from the bitstream to decode the rows transform and 2 other bins to decode the columns transform, where the context for the first bin of each category is $i_c$ and the context for the second bin of each category depends on the value of the first bin.

| Bin | Context Value |
|---|---|
| $b_0$ | $i_c$ |
| $b_1$ | $b_0$ |
| $b_2$ | $i_c$ |
| $b_3$ | $b_2$ |

The mapping between the value of 'transformClass' and the bins can be done as follows:

FIRST EXAMPLE (EXAMPLE 1):

| transformClass | (Rows, Columns) | $b_3$ | $b_2$ | $b_1$ | $b_0$ |
|---|---|---|---|---|---|
| 1 | (DCT-II, DCT-II) | 0 | 0 | 0 | 0 |
| 2 | (DCT-II, DCT-IV) | 0 | 0 | 0 | 1 |
| 3 | (DCT-II, IT) | 0 | 0 | 1 | 0 |
| 4 | (DCT-II, DST-IV) | 0 | 0 | 1 | 1 |
| 5 | (DCT-IV, DCT-II) | 0 | 1 | 0 | 0 |
| 6 | (DCT-IV, DCT-IV) | 0 | 1 | 0 | 1 |
| 7 | (DCT-IV, IT) | 0 | 1 | 1 | 0 |
| 8 | (DCT-IV, DST-IV) | 0 | 1 | 1 | 1 |
| 9 | (IT, DCT-II) | 1 | 0 | 0 | 0 |
| 10 | (IT, DCT-IV) | 1 | 0 | 0 | 1 |
| 11 | (IT, IT) | 1 | 0 | 1 | 0 |
| 12 | (IT, DST-IV) | 1 | 0 | 1 | 1 |
| 13 | (DST-IV, DCT-II) | 1 | 1 | 0 | 0 |
| 14 | (DST-IV, DCT-IV) | 1 | 1 | 0 | 1 |
| 15 | (DST-IV, IT) | 1 | 1 | 1 | 0 |
| 16 | (DST-IV, DST-IV) | 1 | 1 | 1 | 1 |

SECOND EXAMPLE (EXAMPLE 2):

| transformClass | (Rows, Columns) | $b_3$ | $b_2$ | $b_1$ | $b_0$ |
|---|---|---|---|---|---|
| 1 | (DCT-II, DCT-II) | 0 | 0 | 0 | 0 |
| 4 | (DCT-II, DST-IV) | 0 | 0 | 0 | 1 |
| 13 | (DST-IV, DCT-II) | 0 | 0 | 1 | 0 |
| 16 | (DST-IV, DST-IV) | 0 | 0 | 1 | 1 |
| 2 | (DCT-II, DCT-IV) | 0 | 1 | 0 | 0 |
| 14 | (DST-IV, DCT-IV) | 0 | 1 | 0 | 1 |
| 5 | (DCT-IV, DCT-II) | 0 | 1 | 1 | 0 |
| 8 | (DCT-IV, DST-IV) | 0 | 1 | 1 | 1 |

-continued

| transformClass | (Rows, Columns) | $b_3$ | $b_2$ | $b_1$ | $b_0$ |
|---|---|---|---|---|---|
| 3 | (DCT-II, IT) | 1 | 0 | 0 | 0 |
| 15 | (DST-IV, IT) | 1 | 0 | 0 | 1 |
| 9 | (IT, DCT-II) | 1 | 0 | 1 | 0 |
| 12 | (IT, DST-IV) | 1 | 0 | 1 | 1 |
| 6 | (DCT-IV, DCT-IV) | 1 | 1 | 0 | 0 |
| 7 | (DCT-IV, IT) | 1 | 1 | 0 | 1 |
| 10 | (IT, DCT-IV) | 1 | 1 | 1 | 0 |
| 11 | (IT, IT) | 1 | 1 | 1 | 1 |

The coding efficiency of 'transformClass' of the current segment (TU) can be improved by using the values of the prediction type, intra mode, Coded Block Flag (CBF), block size and 'transformClass' of the neighboring TBs and of itself. For instance, let $i_l$ and $i_c$ be the intra modes of the left and current TBs respectively and $t_l$ and $t_c$ the selected transforms for each of them. Then, if $i_l=i_c$ and $t_l=t_c$, then only one bin might be used for signalizing the inverse transform that may be used at the decoder, namely a bin of prefix 130.

The above embodiments and concepts may be used to improve the intra coding performance a video codec such as, for example, HEVC by allowing the encoder to select the most appropriate (that is, the one that achieves the lowest rate-distortion cost) transform from a given set for each TU (Transform unit) or TB (Transform Block), respectively. Merely luma blocks, TBs, or segments, respectively, may be subject to the transform switching concept described herein. Chroma TBs may not be considered, given that they typically concentrate their energy in low frequency components and therefore there is no need to complement the DCT-II, i.e. a single transform may be applied for chroma blocks exclusively, with or without allowing remaining in spatial domain by using IT transform. The implementation of the transform is executed in a separable way like with the core transforms of HEVC. Separability is an advantageous property in the context of transform coding, as it allows the use of fast one-dimensional algorithms that reduce the number of operations that may be performed to compute a two-dimensional transform. Besides, it uncouples the vertical and horizontal directions of a block and therefore permits the use of different 1D transforms on each dimension, which facilitates a better adaption to the content. For this reason, in an exemplary implementation in accordance with an embodiment of the present invention, there are 4 transforms available for the rows and 4 for the columns. Since any combination of any of them is allowed, this means that there are 16 different possible transforms altogether. The new transform pairs may be made available for any TB size, such as, in the exemplary case of HEVC, 4×4, 8×_8, 16×16 and 32×32.

A discussion about a certain one of the above introduced sets of available transforms is provided below.

The transform pool consists of the following options:
DCT-II
DST-IV
DCT-IV
IT

Figure 7:
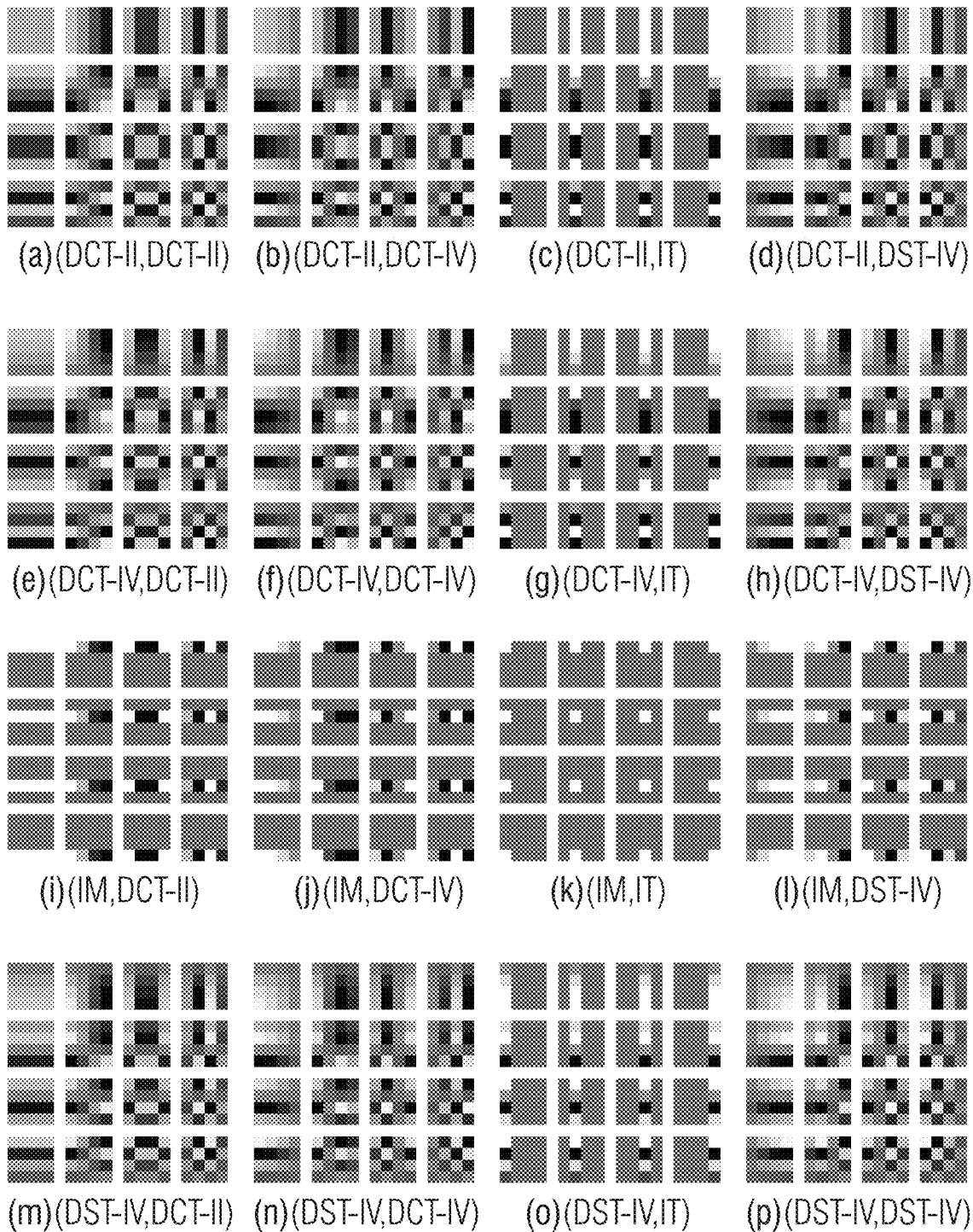
FIG. 7 shows gray scale diagrams showing 4×4 basis functions of all possible transform pairs in the exemplary case of using transform set {x,y} with x and y being transforms applied to x and y, respectively, and x,y □ {DCT-II, DST-N, DCT-IV, IT}

As we can see, three of them are DTTs and the other one is the IT. (DCT-II, DST-IV), (DCT-IV, DCT-IV) or (IT, DCTII) are examples of possible transform pairs. FIG. 7 shows the complete list of all possible transform pairs together with the representation of their basis functions.

Different criteria were considered to select these transforms. First, the DCT-II was an obvious choice, since it has been the default transform in image and video coding applications for many years and works very well if the residual statistics adapt to the first order Markov process model.

Figure 8A:
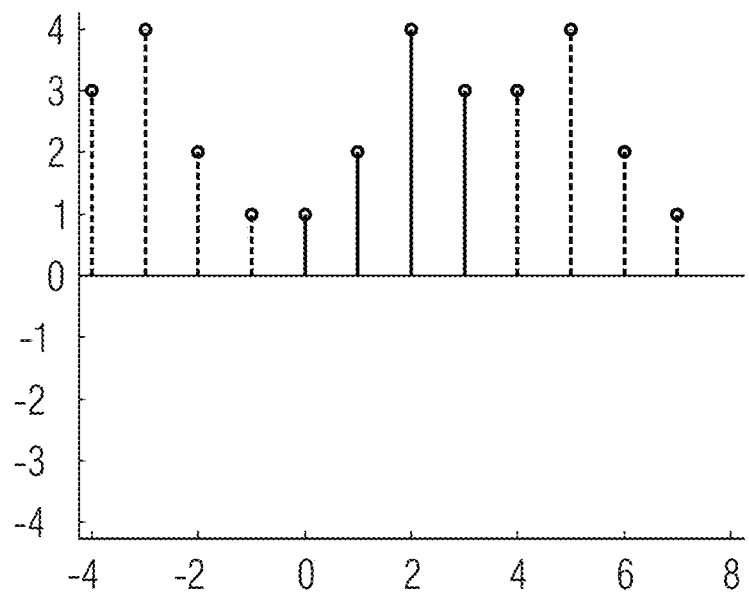
FIG. 8a-d show diagrams of symmetric extentions for various DTTs for an example of a 1D signal. This basic sequence is represented in continuous and the symmetric extentions in dashed lines. Besides, the basic signal in (a), (b) and (c) has a length of 4 samples, whereas the length in (d) and (e) is only 3 samples, since the symmetric extensions involve that one sample be 0 [11].
Figure 8B:
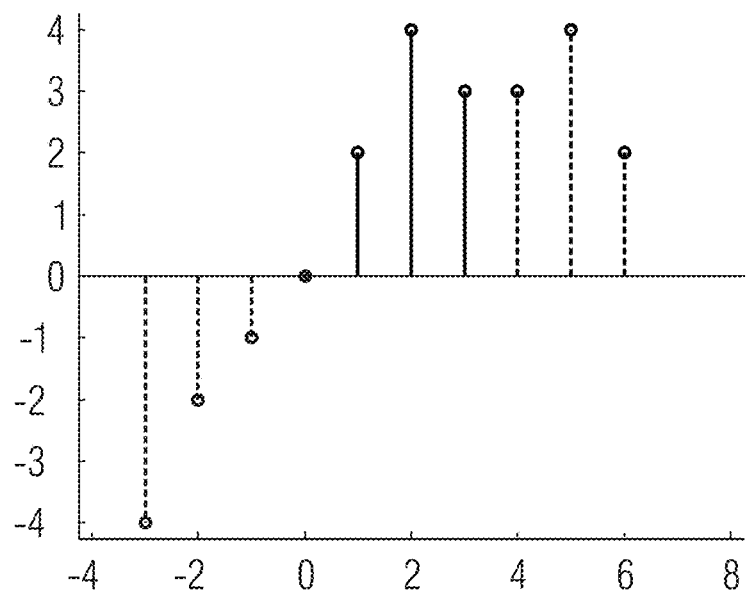

On the other hand, as mentioned above, the findings of [6] led to the consideration and introduction of the DSTVII as an appropriate transform for different types of residual blocks, which is why it could have been a useful candidate for our transform pool. However, we decided to adopt the DSTIV for this role instead. To understand the logic behind this, we have to take into account that the DTTs form a family closely related with the Discrete Fourier Transform (DFT), as explained in [11]. In fact, each of them represents a special case of a Generalized DFT (GDFT), where the difference between each DTT lies in the type of periodic and symmetric extention performed on a signal before applying the DFT on it [11]. For instance, in the case of the well-known DCTII, the extension is carried out by padding both ends of the signal using half-sample even symmetry replicas of the signal, like in the 1D example of FIG. 8(a). The same example is presented for the DST-VII and the DST-IV in FIG. 8(b) and FIG. 8(d) respectively. As it can be seen in both cases, the symmetric extension is odd and even at the left and right sides respectively. The difference lies in the location of the axis of symmetry used at the left end. For the DST-IV it is in the middle of two samples, but in the case of the DST-VII it lies exactly on one sample. The combination of this characteristic and the odd symmetry at the left side forces one sample to be 0. Nevertheless, the symmetric extentions are still practically the same and therefore both transforms are very similar and asymptotically equivalent, with the DST-IV having the advantage of being an even DTTlike the DCTII. Hence, there are many related algorithms in the literature to implement it in a fast way like analogous to the existing ones for DCT-II [2].

Figure 8C:
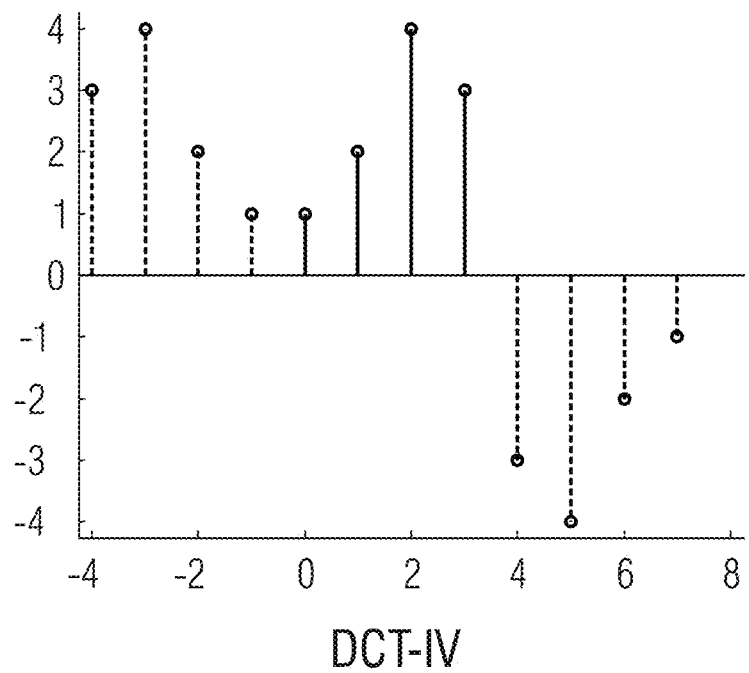
Figure 8D:
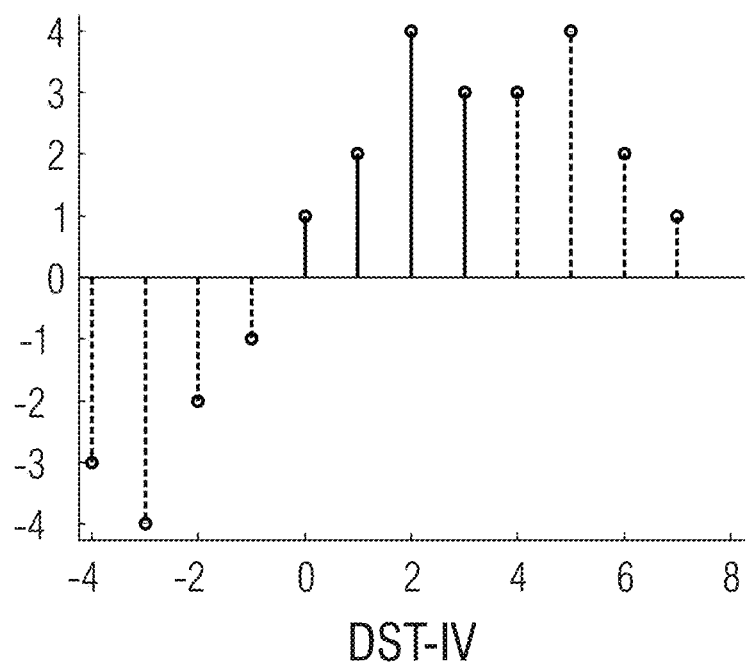

After including the DCT-II and the DST-IV in the transform pool, we decided to select the DCT-IV as well. As depicted in FIG. 8(c), its symmetric extentions are exactly the opposite of the DST-IV ones. This facts leads to a very interesting relationship between both transforms [2]:

$$S_N^{IV} = J_N C_N^{IV} D_N, \quad (1)$$

where $S_N^{IV}$ and $C_N^{IV}$ are the N-point DST-IV and DCT-IV matrices respectively, $J_N$ is an antidiagonal matrix with ones on the antidiagonal (a reflection of the IT) and $D_N$ is a diagonal matrix with entries DN=diag((−1)k), with k=0;1; . . . , N−1 [2]. For this reason, the use of the DCT-IV presents some advantages: First, compared to the DST-IV, its basis functions show an opposite behaviour, as represented in FIG. 7(f) and FIG. 7(p), which is useful to model efficiently other types of residuals for which the DST-IV is not an appropriate transform. Moreover, the relationship expressed by (1) involves only a reordering and a sign change of certain elements on the DST-IV. As a result of this, no further storage requirements are needed to include the DCTIV in the transform pool. And finally, the DCT-IV is also an even DTT, and therefore it can be implemented in a fast way like the other two transforms already discussed.

The IT represents the option of not transforming the signal at all. Hence, the transform pair (IT, IT) is in fact equivalent to the transform skip mode of HEVC [1] (however, the residual samples are still scaled before quantization). In accordance with an embodiment, nevertheless, there is no restriction to 4×4 blocks and the IT can be combined with any of the other transforms of the pool. Thus it is possible to transform only one dimension of the signal (only rows or only columns), which may be very useful to improve the energy compaction of certain residuals. A similar approach was proposed in [12] for inter-predicted residuals in combination with the DCTII. To avoid an unnecessary redundancy at the encoder, the transform skip mode of HEVC may be consequently disabled for intra-predicted blocks and therefore no transform skip flag may be sent to the decoder for this type of TBs. Despite being presented as a 1D transform in the context of the multiple core transforms framework of this paper, it is indubitable that the implementation of the IT does not require to actually perform a matrix multiplication. As in the standard HEVC transform skip mode, the transform stage is simply skipped. Still, however, the residual samples are scaled before quantization.

At the encoder, the selection process of the transform for each luma TB takes place inside the rate-distortion loop. The steps involved in doing so are summarized next:
1) Let Ti and Tj be the possible rows and columns transforms respectively, with i, j=(1, 2, 3, 4).
2) Then, for each transform pair pij=(Ti, Tj):
   a) Transform and quantize the luma TB.
   b) Entropy code the quantized transformed coefficients and the overhead bits that may be used for signaling the trans-form.
   c) Get the rate-distortion cost Jij of the transform pair pij.
3) Finally, the optimal transform pair p*ij=(Ti, Tj) is selected as the one that minimizes Jij.

The same procedure is carried out for every intra-predicted luma TB regardless of the IPM. The rate-distortion cost J used in the algorithm is calculated using the formula $$J = D + \lambda R, \quad (2)$$

where D is the distortion obtained as the sum of squared differences between the original and the reconstructed blocks, R is the number of bits that may be used for sending the quantized coefficients and the encoding parameters to the decoder and A is a constant that regulates the tradeoff between the distortion and the rate [13].

The transform signalization addresses that the transform pair decision taken by the encoder is to be communicated to the decoder. Since there are 16 possible combinations altogether, 4 bins are to be coded. Contextadaptive binary arithmetic coding (CABAC) [1] for each TB may be used. The context may be dependent on the IPM that was used to calculate the residual signal of the current TB, as this allows a better adaption to the statistics of the content.

As to complexity, it has already been noted above, that the encoder may apply a full search strategy to find the optimal transform pair. Despite the fact that such a process ensures the minimization of the rate-distortion cost, it also implies a very significant increase in the algorithmic complexity, given that transform, quantization and entropy coding operations are computed 16 times for each luma TB. At the decoder side, however, there is no significant increment in the algorithmic complexity. One may only parse the transform selection and, unlike the encoder, only one transform is performed for each luma TB. Besides, in the event of receiving a coded block flag (CBF) equal to 0, no transform operations are required at all, since this means all residual coefficients are 0.

The above concept has been implemented in the HEVC Test Model (HM) reference software (version 16.6). Only luma TBs have been affected by this modification. Transform scaling operations have been performed the same way as with the DCT-II in HEVC, as described in [14]. Several tests have been conducted using the High Efficiency (HE) 10 bit profile and an All-Intra (AI) configuration, as indicated by the common test conditions [15].

TABLE I

Bit Savings for all sequences using the AI-HE10 configuration.

| Class | Sequence | BD-Rate |
| --- | --- | --- |
| A: 2560 × 1600 | Trafic | −2.9% |
| | PeopleOnStreet | −3.1% |
| | NebutaFestival | −1.9% |
| | SteamLocomotiveTrain | −2.3% |
| B: 1920 × 1080 | Kimono | −2.4% |
| | ParkScene | −3.4% |
| | Cactus | −3.3% |
| | BasketballDrive | −3.0% |
| | BQTerrace | −2.1% |
| C: 832 × 480 | BasketballDrill | −2.1% |
| | BQMall | −3.0% |
| | PartyScene | −3.1&  |
| | RaceHorses | −2.8% |
| D: 416 × 240 | BasketballPass | −2.5% |
| | BQSquare | −3.3% |
| | BlowingBubbles | −2.8% |
| | RaceHorses | −2.5% |
| E: 1280 × 720 | FourPeople | −2.7% |
| | Johny | −2.5% |
| | KristenAndSara | −2.5% |
| F: Screen Content | BasketballDrillText | −2.8% |
| | ChinaSpeed | −4.0% |
| | SlideEditing | −7.6% |
| | SlideShow | −4.5% |
| Average | | −3.0% |

Table I shows the results of the tests. Each class represents a different type of resolution, except in the case of class F, in which screen content sequences with different resolutions are grouped. Screen content videos display computer generated graphics, text or animations (alone or in combination with camera-captured scenes). As we can see, the average performance of the tool is a 3% bit rate reduction. Besides, all classes exhibit a similar behaviour, except in the case of class F, whose sequences achieve the best results. This is not a surprising fact considering that we have extended the capabilities of the transform skip mode by implementing the IT in the transform pool.

Above we discussed the differences and similarities between the DST-IV and the DST-VII. To obtain a performance comparison between both transforms, we have repeated the tests replacing the DST-IV with the DST-VII as one of the 1D transforms available. The average bit savings results are practically identical (−3.04% for the DST-IV and −3.07% for the DST-VII), which suggests the use of the DST-IV as a replacement of the DST-VII in our system due to its benefits in terms of complexity and storage.

Finally, a Peak Signal to Noise ratio (PSNR) versus rate curve is presented as an example for the sequence BasketballDrill. As it can be observed, the gain is more concentrated around the highest rate points. This is probably due to the fact that in this case the encoder is able to spend more bits to signal the transform for each luma TB and therefore there is a higher adaptation to the content.

Concluding the above, the above-described embodiments have addressed the suboptimality of the DCT-II for transform coding purposes. The use of more transforms of the DTT family and the IM has been proposed according to an embodiment.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded video or picture signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] G. Sullivan, J. Ohm, W.-J. Han, and T. Wiegand, "Overview of the High Efficiency Video Coding (HEVC) Standard," Circuits and Systems for Video Technology, IEEE Transactions on, vol. 22, no. 12, pp. 1649-1668, December 2012.

[2] V. Britanak, P. C. Yip, and K. Rao, Discrete Cosine and Sine Transforms: General Properties, Fast Algorithms and Integer Approximations. Oxford: Academic Press, 2007.

[3] M. Effros, H. Feng, and K. Zeger, "Suboptimality of the Karhunen-Loève transform for transform coding," in Data Compression Conference, 2003. Proceedings. DCC 2003, March 2003, pp. 293-302.

[4] V. K. Goyal, "Theoretical Foundations of Transform Coding," IEEE Signal Processing Magazine, vol. 18, no. 5, pp. 9-21, September 2001.

[5] F. Zou, O. C. Au, C. Pang, J. Dai, X. Zhang, and L. Fang, "Rate-Distortion Optimized Transforms Based on the Lloyd-Type Algorithm for Intra Block Coding," IEEE Journal of Selected Topics in Signal Processing, vol. 7, no. 6, pp. 1072-1083, December 2013.

[6] A. Saxena and F. C. Fernandes, "DCT/DST-Based Transform Coding for Intra Prediction in Image/Video Coding," IEEE Transactions on Image Processing, vol. 22, no. 10, pp. 3974-3981, October 2013.

[7] A. Arrufat, P. Philippe, and O. D'eforges, "Non-separable mode dependent transforms for intra coding in HEVC," in Visual Communications and Image Processing Conference, 2014 IEEE, December 2014, pp. 61-64.

[8] "Rate-distortion optimised transform competition for intra coding in hevc," in Visual Communications and Image Processing Conference, 2014 IEEE, December 2014, pp. 73-76.

[9] "Mode-dependent transform competition for HEVC," in Image Processing (ICIP), 2015 IEEE International Conference on, September 2015, pp. 1598-1602.

[10] J. Chen, Y. Chen, M. Karczewicz, X. Li, H. Liu, L. Zhang, and X. Zhao, "Coding tools investigation for next generation video coding based on HEVC," in Proc. SPIE, Applications of Digital Image Processing XXXVIII, vol. 9599, 2015, pp. 95 991B-95 991B-9. [Online]. Available: dx.doi.org/10.1117/12.2193681

[11] S. A. Martucci, "Symmetric convolution and the discrete sine and cosine transforms," IEEE Transactions on Signal Processing, vol. 42, no. 5, pp.1038-1051, May 1994.

[12] A. Gabriellini, M. Naccari, M. Mrak, D. Flynn, and G. V. Wallendael, "Adaptive transform skipping for improved coding of motion compensated residuals," Signal Processing: Image Communication, vol. 28, no. 3, pp. 197-208, 2013. [Online]. Available: www.sciencedirect.com/science/article/pii/S0923596512002093

[13] H. Schwarz, T. Schierl, and D. Marpe, "Block Structures and Parallelism Features in HEVC," in *High Efficiency Video Coding (HEVC)*, ser. Integrated Circuits and Systems, V. Sze, M. Budagavi, and G. J. Sullivan, Eds. Springer International Publishing, 2014, pp. 49-90.

[14] M. Budagavi, A. Fuldseth, G. Bjøntegaard, V. Sze, and M. Sadafale, "Core Transform Design in the High Efficiency Video Coding (HEVC) Standard," Selected Topics in Signal Processing, IEEE Journal of, vol. 7, no. 6, pp. 1029-1041, December 2013. [14] F. Bossen, "Common Test Conditions and Software Reference Configurations," document JCTVC-L1100 of JCT-VC, Geneva, CH, January 2013.

[15] F. Bossen, "Common Test Conditions and Software Reference Configurations," document JCTVC-L1100 of JCT-VC, Geneva, CH, January 2013.

The invention claimed is:

1. An apparatus for predictively decoding a picture that is subdivided into a set of segments from a data stream, the apparatus comprising:
a processor; and
a memory having instructions which, when executed by the processor, cause the processor to:
decode, from the data stream, an intra-coding mode signalization for a segment from the set of segments;
select an intra-coding mode for the segment using the intra-coding mode signalization;
decode, from the data stream, a transform class signalization corresponding to the segment, the transform class signalization comprising an even a number of bins;
determine that a prefix portion of the transform class signalization indicates a first state or a second state;
in response to the prefix portion indicating the first state, select, for the segment, a transform from a set of transforms based on a previous transform selection of a neighboring segment without decoding a suffix portion of the transform class signalization, wherein the set of transforms is comprised of concatenations of a first one of a set of one-dimensional spectral-to-spatial transforms applied horizontally and a second one of the set of one-dimensional spectral-to-spatial transforms applied vertically;
in response to the prefix portion indicating the second state, decode the suffix portion from the data stream and select, for the segment, a transform from the set of transforms identified by the suffix portion, the suffix portion corresponding to a fixed-length binarization;
continue to parse the data stream for decoding subsequent segments from the set of segments; and
use a first plurality of the bins to index the first one of the set of one-dimensional spectral-to-spatial transforms applied horizontally and a second plurality of the bins, that is different than the first plurality of the bins, to index the second one of the set of one-dimensional spectral-to-spatial transforms applied vertically,
wherein the intra-coding mode is used to read a first bin of the first plurality of the bins and the intra-coding mode is used to read a first bin of the second plurality of the bins, and wherein the first bin of the first plurality of the bins is used to read a second bin of the first plurality of bins and the first bin of the second plurality of the bins is used to read a second bin of the second plurality of bins.

2. The apparatus according to claim 1, wherein the processor is further configured to:
switch between the transforms in the set of transforms for intra-coded segments, and
use one transform or switch between transforms in a different set of transforms for inter-coded segments.

3. The apparatus according to claim 2, wherein in switching between transforms in the set of transforms, the processor is configured to:
select the transform using a mapping of a domain of values, which are indicated by the transform class signalization, onto the transforms in the set of transforms,
wherein each transform in the set of transforms is selectable in a manner independent from the segment's coding mode, and wherein every transform of the set of transforms is selectable.

4. The apparatus according to claim 2, wherein in switching between the transforms in the set of transforms the processor is configured to:
when the segment is an intra-code segment, select, for the intra-coded segment, the transform depending on the transform class signalization for the intra-coded segment.

5. The apparatus according to claim 1, wherein the second spectral-to-spatial transform is different from the first spectral-to-spatial transform.

6. The apparatus according to claim 1, wherein the set of transforms comprises:
a spectral-to-spatial transform which is concatenation of a first one-dimensional spectral-to-spatial transform applied horizontally and a second one-dimensional spectral-to-spatial transform applied vertically,
wherein the first one-dimensional spectral-to-spatial transform is different than the second one-dimensional spectral-to-spatial transform.

7. The apparatus according to claim 1, wherein the set of transforms is composed of different pairs of one of a set of horizontal transforms and one of a set of vertical transforms.

8. The apparatus according to claim 1, wherein the set of one-dimensional spectral-to-spatial transforms comprises an identity transform and one or more discrete cosine/sine transforms.

9. The apparatus according to claim 1, wherein to use the first plurality of the bins to index the first one of the set of one-dimensional spectral-to-spatial transforms applied horizontally and the second plurality of the bins to index the second one of the set of one-dimensional spectral-to-spatial transforms applied vertically, the processor is configured to:

use the first and second pluralities of bins such that the first one and the second one of the one-dimensional spectral-to-spatial transforms are equal to each other if the first and second pluralities of bins are equal to each other.

10. The apparatus according to claim 1, wherein to use the first plurality of the bins to index the first one of the set of one-dimensional spectral-to-spatial transforms applied horizontally and the second plurality of the bins to index the second one of the set of one-dimensional spectral-to-spatial transforms applied vertically, the processor is configured to:

use a first bin of the first plurality of bins and a first bin of the second plurality of bins to discriminate between {identity transform, DST-IV} on the one hand and {DCT-II/III, DCT-IV} on the other hand and a second bin of the first plurality of bins and a second bin of the second plurality of bins to discriminate between {identity transform, DCT-II/III} on the one hand and {DCT-IV, DST-IV} on the other hand.

11. The apparatus according to claim 10, wherein the processor is further configured to select a context for context-adaptively entropy decoding the first bin of the first and second pluralities depending on the second bin of the first and second pluralities, respectively.

12. The apparatus according to claim 10, wherein the processor is further configured to select the context for context-adaptively entropy decoding the second bin of the first and second pluralities depending on the intra-coding mode of the segment for which the transform class signalization is comprised by the data stream.

13. An apparatus for predictively encoding a picture that is subdivided into a set of segments into a data stream, the apparatus comprising:

a processor; and a memory having instructions which, when executed by the processor, cause the apparatus to:

select at least one transform from a set of transforms and an intra-coding mode from a set of intra-coding modes for encoding a segment from the set of segments, wherein the set of transforms is comprised of concatenations of a first one of a set of one-dimensional spatial-to-spectral transforms applied horizontally and a second one of the set of one-dimensional spatial-to-spectral transforms applied vertically;

signal the intra-coding mode in the data stream using an intra-coding mode signalization;

use a transform class signalization signal for indicating the selected transform in the data stream, wherein the transform class signalization comprises a number of bins, and wherein the transform class signalization indicates the selected at least one transform using a prefix portion indicating a first state or a second state, the first state indicating that the selected at least one transform is a previous transform selection of a neighboring segment, the second state indicating a switching to at least one different transform specified by a suffix portion of the transform class signalization;

context-adaptively encode the transform class signalization using a context based on the intra-coding mode; and use a first plurality of the bins to index the first one of the set of one-dimensional spatial-to-spectral transforms applied horizontally and a second plurality of the bins, that is different than the first plurality of the bins, to index the second one of the set of one-dimensional spatial-to-spectral transforms applied vertically;

wherein the intra-coding mode is used to encode a first bin of the first plurality of the bins and the intra-coding mode is used to encode a first bin of the second plurality of the bins, and wherein the first bin of the first plurality of the bins is used to encode a second bin of the first plurality of bins and the first bin of the second plurality of the bins is used to encode a second bin of the second plurality of bins.

14. The apparatus according to claim 13, wherein the processor is further configured to:

switch between the set of transforms for intra-coded segments and steadily use one transform or switch between a different set of transforms for inter-coded segments in spatial-to-spectral transforming a prediction residual signal.

15. The apparatus according to claim 13, wherein the processor is configured to:

signal, for each of a set of the segments, one transform of the set of transforms by way of the transform class signalization for the respective segment in the data stream, wherein every transform of the set of transforms is able to be signaled.

16. The apparatus according to claim 13, wherein the processor is configured to:

signal, for each of intra-coded segments, one of the set of transforms by way of the transform class signalization for the respective intra-coded segment in the data stream by encoding the transform class signalization into the data stream using context-based entropy encoding using a context which depends on an intra-coding mode of the respective intra-coded segment.

17. The apparatus according to claim 13, wherein the first spatial-to-spectral transform is different from the second spatial-to-spectral transform.

18. A method for predictively decoding a picture from a data stream, wherein the picture is subdivided into a set of segments, the method comprising:

decoding, from the data stream, an intra-coding mode signalization for a segment from the set of segments;

selecting an intra-coding mode for the segment using the intra-coding mode signalization;

decoding, from the data stream, a transform class signalization corresponding to the segment based on a context dependent on the intra-coding mode, wherein the transform class signalization comprises a number of bins;

determining that a prefix portion of the transform class signalization indicates a first state or a second state;

in response to the prefix portion indicating the first state, selecting, for the segment, a transform from a set of transforms based on a previous transform selection of a neighboring segment without decoding a suffix portion of the transform class signalization decoding, from the data stream, a transform class signalization corresponding to the segment based on a context dependent on the intra-coding mode, wherein the set of transforms is comprised of concatenations of a first one of a set of one-dimensional spectral-to-spatial transforms applied horizontally and a second one of the set of one-dimensional spectral-to-spatial transforms applied vertically;

in response to the prefix portion indicating the second state, decoding the suffix portion from the data stream and selecting, for the segment, a transform from the set of transforms identified by the suffix portion, the suffix portion corresponding to a fixed-length binarization;

continue parsing the data stream for decoding subsequent segments from the set of segments; and using a first plurality of the bins to index the first one of the set of one-dimensional spectral-to-spatial transforms applied horizontally and a second plurality of the bins, that is different than the first plurality of the bins, to index the second one of the set of one-dimensional spectral-to-spatial transforms applied vertically;

wherein the intra-coding mode is used to read a first bin of the first plurality of the bins and the intra-coding mode is used to read a first bin of the second plurality of the bins, and wherein the first bin of the first plurality of the bins is used to read a second bin of the first plurality of bins and the first bin of the second plurality of the bins is used to read a second bin of the second plurality of bins.

19. The method according to claim 18, further comprising:

switching between the transforms in the set of transforms for intra-coded segments, and using one transform or switching between transforms in a different set of transforms for inter-coded segments.

20. The method according to claim 19, wherein in switching between transforms in the set of transforms, the method further comprises:

selecting the transform using a mapping of a domain of values, which are indicated by the transform class signalization, onto the transforms in the set of transforms, wherein each transform in the set of transforms is selectable in a manner independent from the segment's coding mode, and wherein every transform of the set of transforms is selectable.

21. The method according to claim 19, wherein in the switching between the transforms in the set of transforms, where the segment is an intra-code segment, the method further comprises:

when the segment is an intra-code segment, selecting, for the intra-coded segment, the transform depending on the transform class signalization for the intra-coded segment.

22. The method according to claim 18, wherein the first spectral-to-spatial transform is different from the second spectral-to-spatial transform.

23. The method according to claim 18, wherein the set of transforms comprises:

a spectral-to-spatial transform which is concatenation of a first one-dimensional spectral-to-spatial transform applied horizontally and a second one-dimensional spectral-to-spatial transform applied vertically, wherein the first one-dimensional spectral-to-spatial transform is different than the second one-dimensional spectral-to-spatial transform.

24. The method according to claim 18, wherein the set of transforms is composed of different pairs of one of a set of horizontal transforms and one of a set of vertical transforms.

25. The method according to claim 18, wherein the set of one-dimensional spectral-to-spatial transforms comprises an identity transform and one or more discrete cosine/sine transforms.

26. The method according to claim 18, wherein using the first plurality of the bins to index the first one of the set of one-dimensional spectral-to-spatial transforms applied horizontally and the second plurality of the bins to index the second one of the set of one-dimensional spectral-to-spatial transforms applied vertically, comprises:

using the first and second pluralities of bins such that the first one and the second one of the one-dimensional spectral-to-spatial transforms are equal to each other if the first and second pluralities of bins are equal to each other.

27. The method according to claim 18, wherein using the first plurality of the bins to index the first one of the set of one-dimensional spectral-to-spatial transforms applied horizontally and the second plurality of the bins to index the second one of the set of one-dimensional spectral-to-spatial transforms applied vertically, comprises:

using a first bin of the first plurality of bins and a first bin of the second plurality of bins to discriminate between {identity transform, DST-IV} on the one hand and {DCT-II/III, DCT-IV} on the other hand and a second bin of the first plurality of bins and a second bin of the second plurality of bins to discriminate between {identity transform, DCT-II/III} on the one hand and {DCT-IV, DST-IV} on the other hand.

28. The method according to claim 27, further comprising selecting a context for context-adaptively entropy decoding the first bin of the first and second pluralities depending on the second bin of the first and second pluralities, respectively.

29. The method according to claim 27, further comprising selecting the context for context-adaptively entropy decoding the second bin of the first and second pluralities depending on the intra-coding mode of the segment for which the transform class signalization is comprised by the data stream.

30. A method for predictively encoding a picture that is subdivided into a set of segments, the method comprising:

selecting at least one transform from a set of transforms and an intra-coding mode from a set of intra-coding modes for encoding a segment from the set of segments, wherein the set of transforms is comprised of concatenations of a first one of a set of one-dimensional spatial-to-spectral transforms applied horizontally and a second one of the set of one-dimensional spatial-to-spectral transforms applied vertically;

signaling the intra-coding mode in the data stream using an intra-coding mode signalization;

using a transform class signalization signal for indicating the selected transform in the data stream, wherein the transform class signalization comprises a number of bins, and wherein the transform class signalization indicates the selected at least one transform using a prefix portion indicating a first state or a second state, the first state indicating that the selected at least one transform is a previous transform selection of a neighboring segment, the second state indicating a switching to at least one different transform specified by a suffix portion of the transform class signalization;

context-adaptively encoding the transform class signalization using a context based on the intra-coding mode; and using a first plurality of the bins to index the first one of the set of one-dimensional spatial-to-spectral transforms applied horizontally and a second plurality of the bins, that is different than the first plurality of the bins, to index the second one of the set of one-dimensional spatial-to-spectral transforms applied vertically;

wherein the intra-coding mode is used to encode a first bin of the first plurality of the bins and the intra-coding mode is used to encode a first bin of the second plurality of the bins, and wherein the first bin of the first plurality of the bins is used to encode a second bin of the first plurality of bins and the first bin of the second plurality of the bins is used to encode a second bin of the second plurality of bins.

31. The method according to claim 30, further comprising:
switching between the set of transforms for intra-coded segments; and
steadily using one transform or switching between a different set of transforms for inter-coded segments in spatial-to-spectral transforming a prediction residual signal.

32. The method according to claim 30, further comprising signaling, for each of a set of the segments, one transform of the set of transforms by way of the transform class signalization for the respective segment in the data stream, wherein every transform of the set of transforms is able to be signaled.

33. The method according to claim 30, further comprising signaling, for each of intra-coded segments, one of the set of transforms by way of the transform class signalization for the respective intra-coded segment in the data stream by encoding the transform class signalization into the data stream using context-based entropy encoding using a context which depends on an intra-coding mode of the respective intra-coded segment.

34. The method according to claim 30, wherein the first spatial-to-spectral transform is different from the second spatial-to-spectral transform.

35. A non-transitory computer readable medium encoded with a computer program that, when executed by a computer, causes the computer to implement a method for predictively decoding a picture that is subdivided into a set of segments from a data stream, the method comprising:
decoding, from the data stream, an intra-coding mode signalization for a segment from the set of segments;
selecting an intra-coding mode for the segment using the intra-coding mode signalization;
decoding, from the data stream, a transform class signalization corresponding to the segment based on a context dependent on the intra-coding mode, the transform class signalization comprising a number of bins;
determining that a prefix portion of the transform class signalization indicates a first state or a second state;
in response to the prefix portion indicating the first state, selecting for the segment, a transform from a set of transforms based on a previous transform selection of a neighboring segment without decoding a suffix portion of the transform class signalization, wherein the set of transforms is comprised of concatenations of a first one of a set of one-dimensional spectral-to-spatial transforms applied horizontally and a second one of the set of one-dimensional spectral-to-spatial transforms applied vertically;
in response to the prefix portion indicating the second state, decoding the suffix portion from the data stream and select, for the segment, a transform from the set of transforms identified by the suffix portion, the suffix portion corresponding to a fixed-length binarization;

continue to parse the data stream for decoding subsequent segments from the set of segments; and
using a first plurality of the bins to index the first one of the set of one-dimensional spectral-to-spatial transforms applied horizontally and a second plurality of the bins, that is different than the first plurality of the bins, to index the second one of the set of one-dimensional spectral-to-spatial transforms applied vertically;
wherein the intra-coding mode is used to read a first bin of the first plurality of the bins and the intra-coding mode is used to read a first bin of the second plurality of the bins. and wherein the first bin of the first plurality of the bins is used to read a second bin of the first plurality of bins and the first bin of the second plurality of the bins is used to read a second bin of the second plurality of bins.

36. A non-transitory computer readable medium encoded with a computer program that, when executed by a computer, causes the computer to implement a method for predictively encoding a picture that is subdivided into a set of segments into a data stream, the method comprising:
selecting at least one transform from a set of transforms and an intra-coding mode from a set of intra-coding modes for encoding a segment from the set of segments, wherein the set of transforms is comprised of concatenations of a first one of a set of one-dimensional spatial-to-spectral transforms applied horizontally and a second one of the set of one-dimensional spatial-to-spectral transforms applied vertically;
signaling the intra-coding mode in the data stream using an intra-coding mode signalization ;
using a transform class signalization signal for indicating the selected transform in the data stream, wherein the transform class signalization comprises a number of bins, and wherein the transform class signalization indicates the selected at least one transform using a prefix portion indicating a first state or a second state, the first state indicating that the selected at least one transform is a previous transform selection of a neighboring segment, the second state indicating a switching to at least one different transform specified by a suffix portion of the transform class signalization;
context-adaptively encode the transform class signalization using a context based on the intra-coding mode; and
using a first plurality of the bins to index the first one of the set of one-dimensional spatial-to-spectral transforms applied horizontally and a second plurality of the bins, that is different than the first plurality of the bins, to index the second one of the set of one-dimensional spatial-to-spectral transforms applied vertically;
wherein the intra-coding mode is used to encode a first bin of the first plurality of the bins and the intra-coding mode is used to encode a first bin of the second plurality of the bins, and wherein the first bin of the first plurality of the bins is used to encode a second bin of the first plurality of bins and the first bin of the second plurality of the bins is used to encode a second bin of the second plurality of bins.

* * * * *